US009821447B2

(12) United States Patent
Robson

(10) Patent No.: US 9,821,447 B2
(45) Date of Patent: Nov. 21, 2017

(54) CUSHIONING SLIDES

(71) Applicant: Terminator IP Limited, Matamata (NZ)

(72) Inventor: Angus Peter Robson, Matamata (NZ)

(73) Assignee: TERMINATOR IP LIMITED, Matamata (NZ)

( * ) Notice: Subject to any disclaimer, the term of this patent is extended or adjusted under 35 U.S.C. 154(b) by 486 days.

(21) Appl. No.: 14/414,878

(22) PCT Filed: Jul. 18, 2013

(86) PCT No.: PCT/IB2013/055909
§ 371 (c)(1),
(2) Date: Jan. 14, 2015

(87) PCT Pub. No.: WO2014/013466
PCT Pub. Date: Jan. 23, 2014

(65) Prior Publication Data
US 2015/0202763 A1 Jul. 23, 2015

(30) Foreign Application Priority Data
Jul. 18, 2012 (NZ) ........................................ 601317

(51) Int. Cl.
*B25D 17/24* (2006.01)
*E21B 1/02* (2006.01)
(Continued)

(52) U.S. Cl.
CPC ................ *B25D 17/24* (2013.01); *B32B 7/02* (2013.01); *B32B 15/095* (2013.01); *B32B 15/18* (2013.01);
(Continued)

(58) Field of Classification Search
CPC .... B25D 17/00; B25D 17/024; B25D 17/028; B25F 5/02; E21B 1/02; E02F 5/305; E02F 3/966; E02F 3/00
(Continued)

(56) References Cited

U.S. PATENT DOCUMENTS 3,866,690 A * 2/1975 Lance ...................... B25D 9/12
173/127
4,809,402 A * 3/1989 Rainville .............. B29C 69/003
16/372
(Continued)

FOREIGN PATENT DOCUMENTS

EP 0412203 A1 2/1991
EP 1627960 A2 2/2006

OTHER PUBLICATIONS

International Search Report and Written Opinion dated Dec. 13, 2013, International Patent Application No. PCT/IB2013/055909 with International Filing Date of Jul. 18, 2013, (8 pages).

*Primary Examiner* — Scott A. Smith
(74) *Attorney, Agent, or Firm* — Stephen M. De Klerk

(57) ABSTRACT

An apparatus (1) with a reciprocating component (3) fitted with composite cushioning slides (13) on an exterior surface (8, 9). The reciprocating component (3) is movable along a reciprocation path and the composite cushioning slide (13) includes an exterior first layer (14) and an interior second layer (15). The first layer (14) is formed with an exterior surface (16) configured and orientated to come into sliding contact with a containment surface (7) of the apparatus (1) during the reciprocating movement of the reciprocating component (3), the first layer (14) is formed from a material of predetermined friction and/or abrasion resistance properties. The interior second layer (15) is located between the first layer (14) and reciprocating component (3) and is
(Continued)

formed from a shock-absorbing material having predetermined shock absorbing properties.

54 Claims, 19 Drawing Sheets

(51) Int. Cl.
| | |
|---|---|
| *B32B 7/02* | (2006.01) |
| *B32B 15/095* | (2006.01) |
| *B32B 15/18* | (2006.01) |
| *B32B 27/08* | (2006.01) |
| *B32B 27/28* | (2006.01) |
| *B32B 27/32* | (2006.01) |
| *B32B 27/40* | (2006.01) |
| *F16C 29/00* | (2006.01) |
| *F16C 29/02* | (2006.01) |
| *B25D 17/00* | (2006.01) |
| *E02F 3/96* | (2006.01) |

(52) U.S. Cl.
CPC ............ *B32B 27/08* (2013.01); *B32B 27/288* (2013.01); *B32B 27/32* (2013.01); *B32B 27/40* (2013.01); *E21B 1/02* (2013.01); *F16C 29/002* (2013.01); *F16C 29/02* (2013.01); *B25D 17/00* (2013.01); *B25D 2222/42* (2013.01); *B25D 2222/57* (2013.01); *B25D 2222/61* (2013.01); *B32B 2307/538* (2013.01); *B32B 2307/56* (2013.01); *B32B 2475/00* (2013.01); *E02F 3/966* (2013.01); *F16C 2202/04* (2013.01); *F16C 2202/06* (2013.01); *F16C 2204/60* (2013.01); *F16C 2208/10* (2013.01); *F16C 2240/12* (2013.01); *F16C 2240/26* (2013.01); *F16C 2300/28* (2013.01)

(58) Field of Classification Search
USPC ... 173/90, 128, 171, 162.1, 162.2, 210, 211, 173/28, 184, 115, DIG. 2; 384/295; 299/37, 37.4, 70; 91/165, 189 R
See application file for complete search history.

(56) References Cited

U.S. PATENT DOCUMENTS

| | | | | |
|---|---|---|---|---|
| 5,285,858 | A * | 2/1994 | Okada | E02F 3/966 173/162.1 |
| 5,309,620 | A * | 5/1994 | Shinohara | B29C 65/5057 29/432 |
| 6,095,257 | A * | 8/2000 | Lee | B25D 17/24 173/162.1 |
| 6,135,214 | A * | 10/2000 | Last | E02D 7/10 173/128 |
| 7,628,222 | B2 * | 12/2009 | Yoshimura | E02F 3/966 173/162.1 |
| 8,061,439 | B2 * | 11/2011 | Nelson | B28D 1/26 173/128 |
| 8,181,716 | B2 * | 5/2012 | Robson | B25D 17/08 173/210 |
| 8,708,061 | B2 * | 4/2014 | Nickels | B25D 17/24 173/128 |
| 2009/0304315 | A1 * | 12/2009 | Johnson | B23P 9/025 384/295 |
| 2010/0139939 | A1 * | 6/2010 | Kim | B25D 17/00 173/115 |
| 2012/0145424 | A1 * | 6/2012 | Nickels | E02F 3/966 173/90 |

* cited by examiner

Figure 5
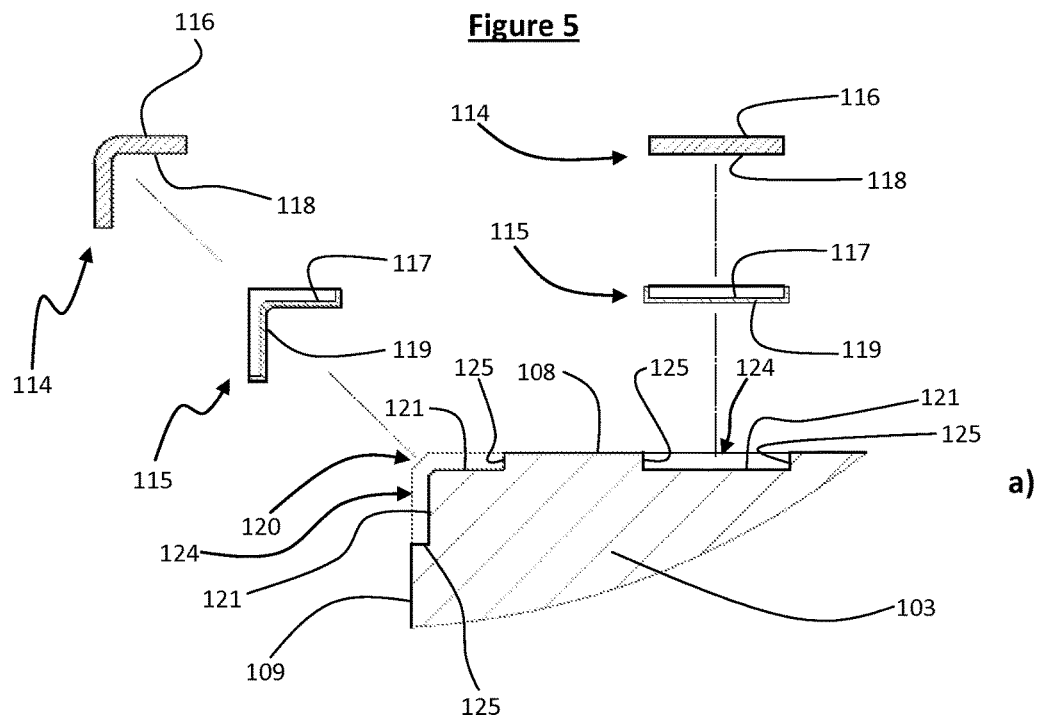
a)
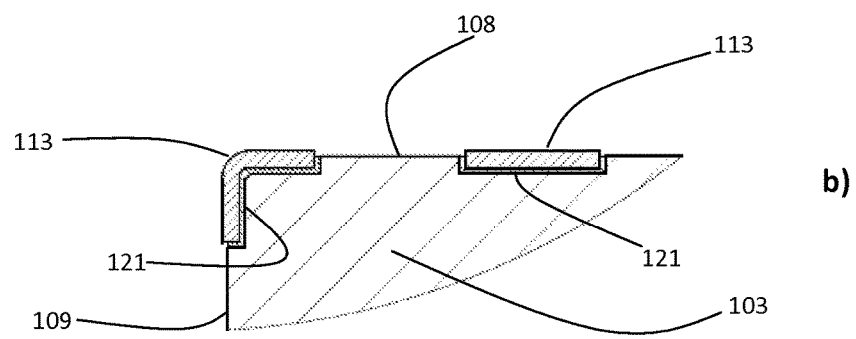
b)
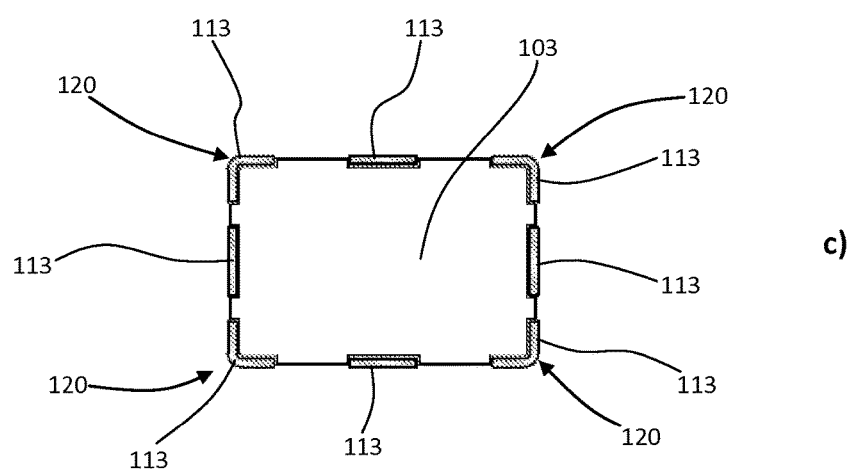
c)

Figure 13
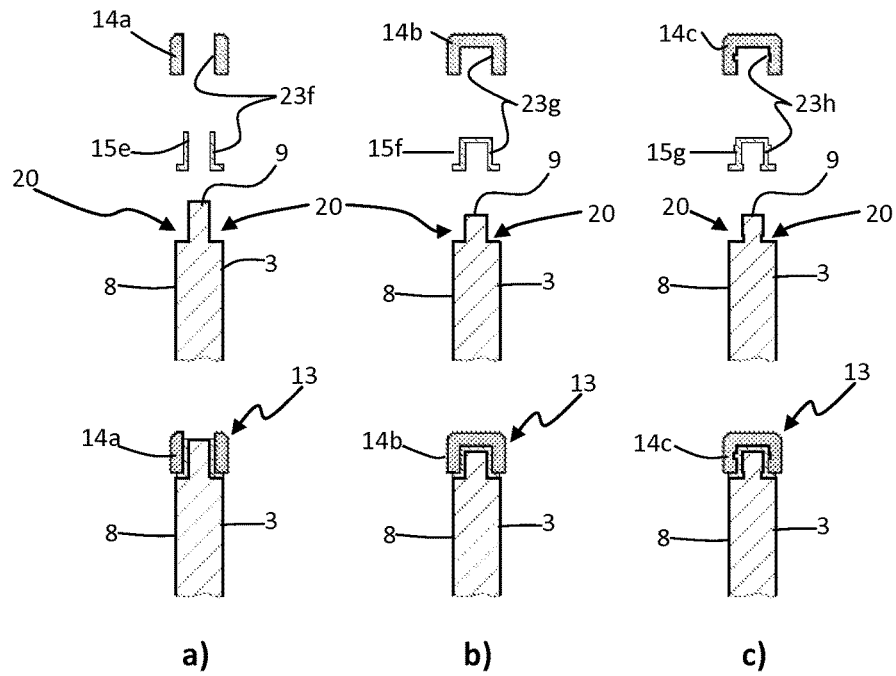
a) b) c)
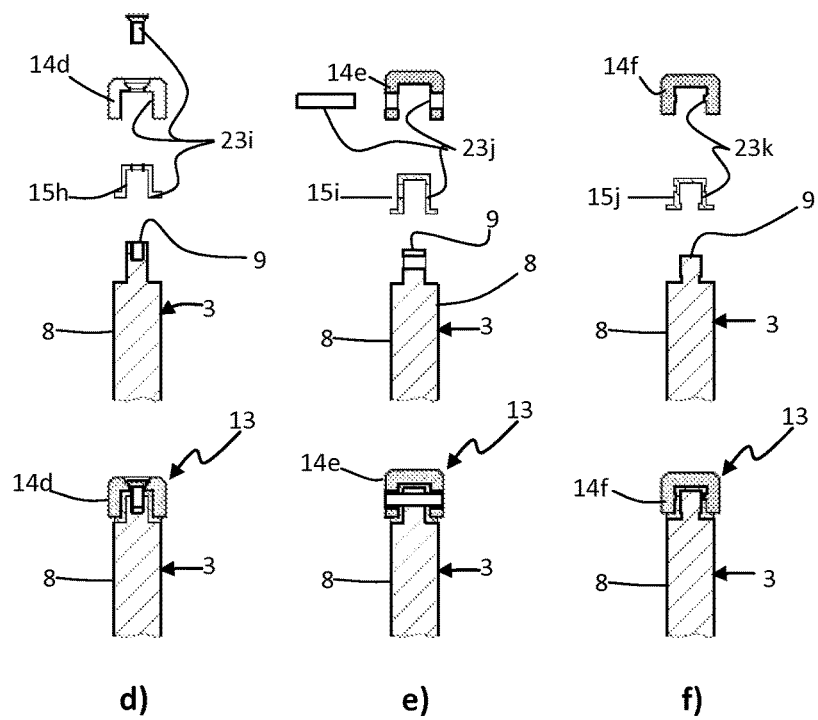
d) e) f)

Figure 14
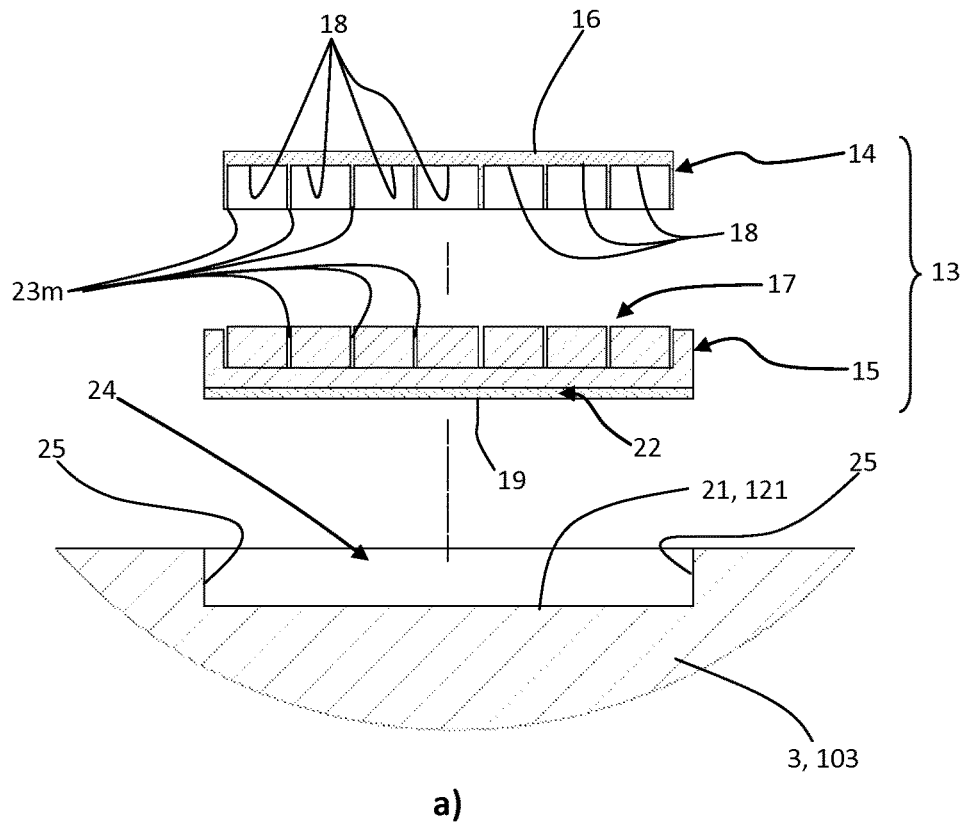
a)
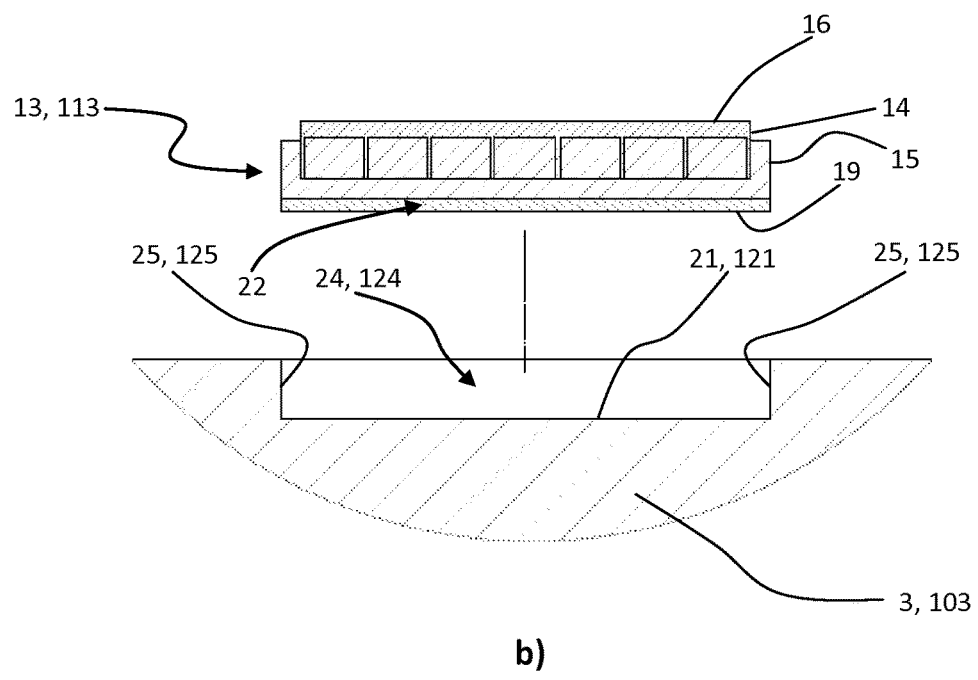
b)

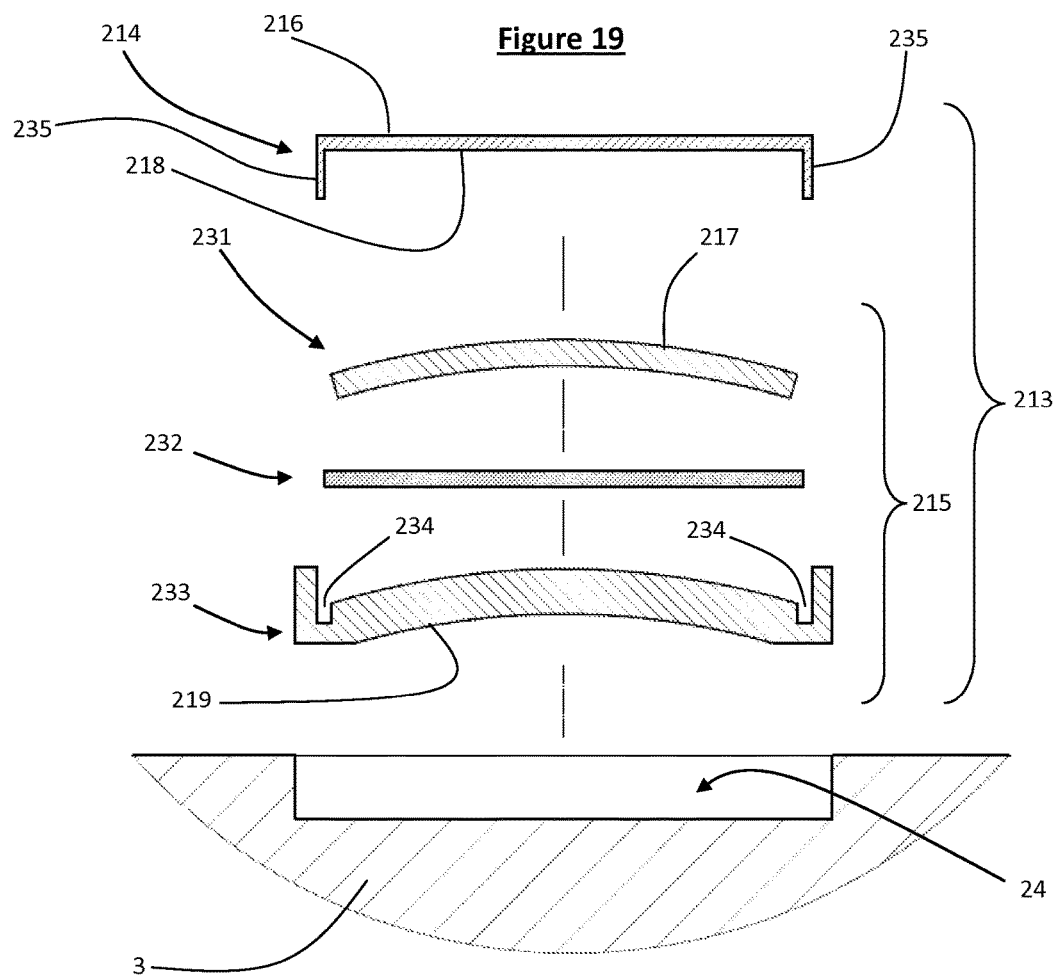
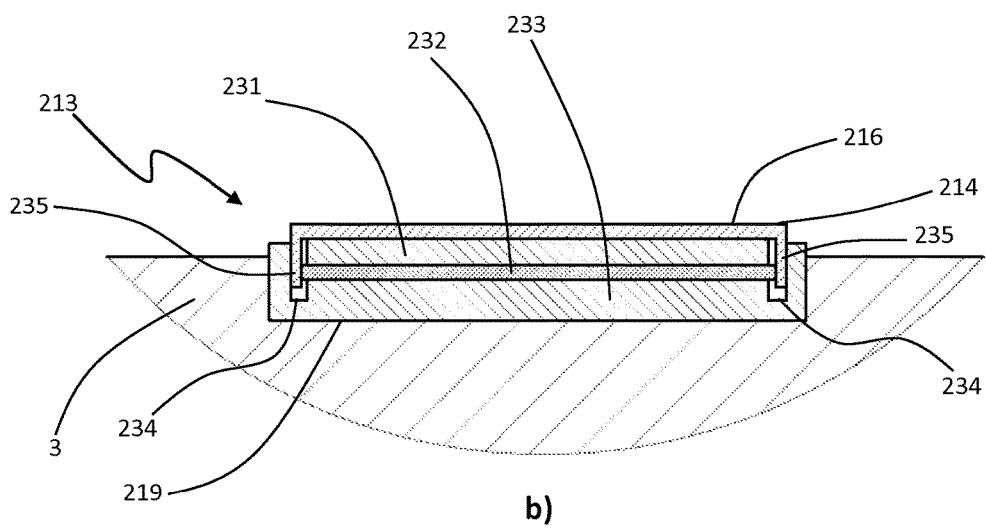
Figure 19

CUSHIONING SLIDES

CROSS-REFERENCE TO OTHER APPLICATIONS

This is a National Phase of International Application No. PCT/IB2013/055909 filed on Jul. 18, 2013, which claims priority from New Zealand Patent Application No. 601317, filed on Jul. 18, 2012.

TECHNICAL FIELD

The present invention relates to a means for providing cushioning slides for machinery including moving parts in mutually sliding and/or impacting contact, and in particular, to impact hammers, drop hammers and other breaking apparatus in which impact power is derived from reciprocating a mass.

BACKGROUND ART

Machinery such as rock breakers, impact hammers, drop hammers and the like apply significant impact forces to both the working surface being impacted and the machinery itself. The impact forces generate both a kinetic impulse and an audio shockwave, the magnitude and origin of which is dependent on numerous factors including the:

machinery size,
mass and velocity of the impacting weight,
construction of the machinery
nature of the working surface and
angle of impact.

The effects of both the physical shock and the noise generated during impacts can have significant adverse effects on the economics of impacting operations. The machinery apparatus must be manufactured with sufficient structural strength to withstand the repetitive impacts, whilst repairs and replacements of various parts of the apparatus are required over time due to ongoing wear and tear. The additional costs of both these issues are overheads on the cost efficiencies of operating the apparatus.

Furthermore, legislation, health, safety and environmental requirements in many countries now impose restrictions on the noise levels and time periods that such impacting apparatus may be operated. Restrictions are particularly stringent in areas adjacent urban populations.

Consequently, any attenuation in the magnitude of the kinetic and/or audible effects of the impact can be realised as efficiency and cost-effectiveness improvements including;

a lighter, less reinforced, cheaper apparatus construction to produce the same impact force on the working surface;
a greater impact force on the working surface from the same impact mass, and same lifting mechanism, due to less frictional losses on both lifting and descent stroke;
noise reduction enables either the use of more powerful reciprocating mechanisms for the same volume levels, or the ability to operate closer to noise restricted areas with the same reciprocating mechanism.

The inherent characteristics of breaking apparatus such as highly repetitive cyclical operations, high velocities of the descending weight, large shock loads that can be transferred to the apparatus, variation in properties of impact surface, angle of impact and so forth, create challenges for any material used to provide low friction interfaces between the moving surfaces of the apparatus, while having sufficient resilience to accommodate the shock loads. One method of reducing the friction in many reciprocating mechanisms is to use a lubricant coating on the surfaces that make contact. However, in many applications, particularly rock-breaking applications, wet lubricants cannot be used as the dust generated during operation will adhere to the lubricant and result in a higher-friction and abrasive interface, and dry lubricants do not always perform well on mating surfaces with low contact areas and high pressures such as rock breaker guide columns.

It would thus be advantageous to provide impact cushioning slides capable of addressing the aforesaid difficulties.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein; this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

It is an object of the present invention to address the foregoing problems or at least to provide the public with a useful choice.

Further aspects and advantages of the present invention will become apparent from the ensuing description which is given by way of example only.

DISCLOSURE OF INVENTION

The present invention provides An apparatus including a reciprocating component fitted with at least one composite cushioning slide on an exterior surface of the reciprocating component, said reciprocating component being movable along a reciprocation path and said composite cushioning slide including:

an exterior first layer, formed with an exterior surface configured and orientated to come into at least partial sliding contact with a containment surface of said apparatus during said reciprocating movement of the component, said first layer being formed from a material of predetermined friction and/or abrasion resistance properties, and an interior second layer located between said first layer and said reciprocating component, said second layer at least partially formed from a shock-absorbing material having predetermined shock absorbing properties.

Preferably, the second layer has at least one surface connected to the first layer and an interior surface connected to the reciprocating component.

The first layer exterior surface is preferably a lower-friction surface than said second layer.

Apparatus including a reciprocating component may take many forms and the present invention is not limited to any individual configuration. Examples of such apparatus include mechanical impact hammers, gravity drop hammers, powered drop hammers, jack hammers, impactors, rock-breakers, and the like.

The present invention is particularly suited for use with a mechanical impact hammer and to further reduce prolixity, the present invention will herein be described with respect to use with same.

As used herein, the term 'reciprocating' includes, but is not limited to, any operating cycle of the apparatus whereby during operation of the apparatus, the reciprocating component repeatedly moves along the same path, including linear, non-linear, interrupted, orbital and irregular paths and any combination of same.

As used herein, the term 'partial contact' includes, but is not limited to, intermittent, continuous, interrupted, instantaneous, partial, infrequent, periodic, and irregular contact with the containment surface with respect to time and/or distance and any combination of same.

As used herein, the term 'containment surface' includes any structure, surface, object or the like that is positioned so as to come into at least partial contact with the reciprocating component or composite cushioning slide during operation of the apparatus.

As used herein, the term 'working surface' includes any surface, material or object subject to impacting, contact, manipulation, movement by the apparatus.

As used herein, the term 'connected' with reference to the first and second layers refers to any possible mechanism or method for connection and includes, but is not limited to, adherence, releasable connection, mating profiles or features, nesting, clips, screws, threads, couplings or the like.

Typically, gravity impact hammers cyclically lift and drop a large weight to crush rocks concrete, stones, metal, asphalt and the like, where the weight is lifted by a powered drive mechanism of some form (e.g. hydraulic) and falls freely under gravity. In a development of such gravity drop hammers, the present inventor devised a powered drop hammer (as described in WO/2004/035941 and incorporated herein by reference) where the weight is actively driven downwards to impact the surface.

Although hammers may be formed in any shape, including irregular or circular in cross section, they are typically vertically elongate with a rectangular or square lateral cross-section and are raised and lowered about a linear impact axis.

The weight itself may be formed directly as a hammer whereby one or more distal ends of the weight are formed with tool ends shaped to strike the working surface. Alternatively, the weight may simply be formed as a block of any convenient shape which falls onto a striker pin on the downstroke which in-turn strikes the working surface (as described in the inventor's prior publications WO/2006/123950 and WO/2006/123948, WO/2008/069685 incorporated herein by reference).

The weight is at least partially located in, and operates in a housing which protects vulnerable portions of the apparatus and reduces debris ingress from the impacting operations from fouling the apparatus. The housing also acts as a guide to ensure the path of the weight during the lift or descent stroke remains laterally constrained to prevent damaging the apparatus and/or causing instability. Ideally, the weight would travel upwards and downwards without touching the interior sides of the housing, thereby avoiding any detrimental friction.

In practice, the impacting operations are undertaken at a wide variety of inclinations, and are seldom perfectly vertical. Moreover, the nature of the working surface may result in multiple impacts before fracture occurs, and thus the hammer or striker pin may recoil away from the un-broken working surface. The direction of the recoiling hammer/striker pin will predominately include a lateral component, thereby bringing it into contact with the inner side walls of the housing.

Thus, according to one embodiment, said apparatus is an impact hammer, wherein said reciprocating component is a weight and said containment surface is an impact hammer's housing inner side walls.

It will be appreciated therefore that undesirable contact may occur between the weight and the hammer housing during three separate phases of the impacting operation cyclical process, where the weight:
  drags against the housing inner side walls during raising of the weight;
  glances or bounces obliquely into contact with the housing inner side walls on the downstroke,
  makes lateral contact with the housing during the downstroke, particularly when the apparatus is inclined from vertical as the weight slides along the housing;
  makes lateral contact with the housing due to force applied by a driving mechanism and/or
  rebounds into the housing inner side walls after impacting the working surface.

The contact between the weight and the hammer housing inner side walls in the above-described three stages may vary in duration, impact angle and magnitude according to the design of the apparatus, inclination of the apparatus during impacting operations and the specifics of the working surface. The velocity of the reciprocating component in the applicant's own breaking machines can reach 8 $ms^{-1}$ in a driven hammer and up to 10 $ms^{-1}$ in a gravity-only drop hammer. The gravity-only drop hammer experiences the peak PV (pressure×velocity) when inclined at approximately 30 degrees from vertical as the weight bears on the housing side walls.

Regarding the apparatus design, pertinent parameters include the size and shape of the weight and the degree of lateral clearance between the weight's lateral periphery and the housing inner side walls.

As referred to above, the housing inner side walls act as barriers to the ingress of material and also constrain or guide the movement of the weight within the lateral confines of the housing side walls. In prior art apparatus, the clearance between the weight and the housing side walls is a compromise between competing factors, namely;
  a narrow clearance minimizes the space for the weight to be accelerated laterally, thereby decreasing the impact force on the housing inner side walls, at the expense of a high precision requirement during manufacturing
  a large clearance reduces the precision required during manufacturing, at the expense of allowing the weight to be accelerated under the effects of any lateral force component for a longer duration resulting in a greater impact force on the housing inner side walls.

To maximise the operating efficiency of an impact hammer, it is desirable to minimise any impediment, hindrance or drag caused by the housing during lifting of the weight which would increase wear and slow the cycle time of the apparatus. Equally, any such impediment to the passage of the weight on the downstroke would dissipate energy that could otherwise be imparted to the working surface. The weight is thus typically raised by the drive mechanism in a manner designed to avoid any undue contact with the housing, e.g. via a strop attached to the upper centre of the weight.

It will be appreciated that while the housing inner side walls do constrain the path of the weight, they do not always guide the weight in the sense of providing a continual, active or direct directional control over the weight's path. However, the housing inner side walls adjacent the path of the weight do still laterally constrain the path of the weight, within defined boundaries, effectively acting as a guide.

Consequently, and to aid clarity, the containment surface adjacent the path of the weight is also referred to as the housing inner side walls.

Mechanical breaking apparatus operate by applying high impact forces to the working surface, achieved by the abrupt deceleration of the large weight at the instant of impact. It is thus an unavoidable consequence of the high energy kinetic forces generated by the downward acceleration of the weight that any impact with the housing inner side walls causes appreciable shock forces and noise. Moreover, if the working surface fails to fracture, or deforms in a manner insufficient to fully dissipate all of the impact energy, any lateral component of the re-bounding weight's movement will result in an impact between the weight and the housing inner side walls, also generating high levels of shock and noise.

The present invention addresses these difficulties by providing said cushioning slides on the reciprocating weight. Although it is conceivable to place cushioning slides on the static surface of the housing inner side walls, this is impractical and uneconomic for several reasons.

Firstly, the entire length of the reciprocation path of the weight would require cushioning slides protection. In comparison, only a relatively small fraction of the weight requires covering by the cushioning slides with an attendant materials cost saving.

Secondly, as the housing (including the housing inner side walls) needs to be highly robust, they are typically formed as welded steel elongated passageways and therefore create voids in which it is highly problematic to add, maintain or replace cushioning slides.

Thirdly, the effect of repeated impact/contacts by the weight on an elongated cushioning slide is to generate ripples in the first and second layers which distort into the path of the falling weight, ultimately leading to failure.

Finally, it offers no intrinsic advantage over locating the cushioning slides on the weight to offset the aforesaid drawbacks. Naturally, the properties of the materials used in the cushioning slides are critical to their successful functioning.

The types of contact between the weight and housing inner side walls described above are characterised by high speeds and very high impact forces. Unfortunately, materials possessing a low coefficient of friction are typically not highly shock absorbent. Conversely, highly shock-absorbing materials typically have high coefficients of friction. It is thus not feasible to create an effective cushioned slide from a single material.

Further difficulties include the practical challenges of attaching or forming a cushioning slide on the surface of an impact hammer weight. Due to the high impact forces involved and the near instantaneous deceleration of the reciprocating weight when impacting the working surface (either directly or via a striker pin), extremely high loads (e.g. 10,000N) are placed on any attachment system used to secure the slides to the weight. It is thus desirable for the cushioning slides to be as light as feasible to minimize such loads.

The first layer exterior surface is preferably formed from a material of predetermined low friction properties and of a suitable material able to minimize friction and maximize abrasion resistance during the repeated high velocity contacts (e.g. up to 10 $ms^{-1}$) with the housing inner side walls. According to one aspect, said first layer is formed from the group of engineering plastics including:

Ultra High Molecular Weight Polyethylene (UHMWPE), Spectra®, Dyneema®
Polyether Ether ketone (PEEK)
PolyAmide-Imide (PAI)
PolyBenzimldazole (PBI)
PolyEthylene Terephthalate (PET P)
PolyPhenylene Sulphide (PPS)
Nylon including lubricant and/or reinforced filled nylon such as Nylatron™ NSM or Nylatron™ GSM.
Composites such as Orkot
any combination or permutation of the above.

The above list is not restrictive and should also be interpreted to include modifications to the above materials by modifying fillers, reinforcing materials and post-forming treatments such as irradiation for cross-linking polymer chains. Desirable characteristics for said first layer material include lightness, high wear resistance under moderate to high speed and pressure, shock resistance, a low friction coefficient and lower hardness to minimise noise levels on impact.

It is also possible to use metals for the first layer where a more robust material is required and in one embodiment the first layer is formed from:

Cast iron, and/or
Steel, including any alloy and/or heat treatment of the steel.

The weight of metal plates may be too great for most applications and so when used in the first layer, preferably utilises weight-reducing measures such as hollowing out to reduce mass-per-unit area.

New materials such as graphene, whilst not being presently commercially viable, may soon be a useful substitute for the above plastic or metal materials and provided they meet or exceed the physical requirements of the first layer they may be suitable for use in the present invention.

Preferably, said predetermined low friction properties of the first layer are an unlubricated coefficient of friction of less than 0.35 on dry steel of surface roughness Ra 0.8 to 1.1 µm.

Preferably, said predetermined abrasion resistance properties of the first layer are a wear rate of less than $10 \times 10^{-5}$ $m^2/N$ using metric conversion from ASTM D4060

Preferably, said first layer also possesses:
tensile strength of more than 20 MPa and compressive strength at 10% deflection of more than 30 MPa.
a hardness of more than 55 Shore D.
a high PV (pressure×velocity) value e.g. above 3000.

It will be appreciated by one skilled in the art, that a material with a low co-efficient of friction does not necessarily have a high abrasion resistance and vice versa. The use of UHMWPE offers particular performance benefits for both low friction and abrasion resistance at lower speeds and pressures. UHMWPE has high toughness and is economical to use, and allows the second layer to be formed as a thinner and/or less complex layer. For higher speeds and pressures, other more expensive plastics with high PV but reduced toughness such as Nylatron™ NSM may be used for the first layer with the second layer formed to be capable of more shock absorption per unit area.

Usage of dense materials such as steel requires appropriately designed mounting to ensure it doesn't dislodge from the weight during impacting operations.

In one embodiment, the first layer exterior surface may have an application of a dry lubricant such as spray-on graphite, Teflon or molybdenum disulphide and/or the first layer may be embedded with a dry lubricant such as molybdenum disulphide.

The choice of material chosen for the first layer exterior surface is important for the effectiveness of the cushioning slide and will be chosen depending on the size of the reciprocating component, the forces involved and the operating environment. In low-friction materials there is often a trade-off made between wear and impact resistance with very low friction materials, (e.g. PTFE) not having enough impact resistance for the impact force remaining after the impact absorption performed by the second layer. In one preferred embodiment, the first layer material is chosen to have as low co-efficient of friction as possible while being able to withstand an instantaneous sliding speed of more than 5 $ms^{-1}$ and up to 10 $ms^{-1}$ at a sliding pressure of more than 0.05 MPa and up to 4 MPa with a wear rate of no more than 0.01 $cm^3$ per meter of travel, when used on housing inner side walls of steel with surface roughness of approx Ra=0.8 to 1.1 μm. The first layer material is preferably capable of withstanding a shock pressure of more than 0.3 MPa and up to 20 MPa without permanent deformation.

The second layer is preferably formed from a material of predetermined shock absorbency properties and needs to be able to be attachable to a metal weight and the first layer, as well as being flexible and shock absorbing.

The second layer's shock-absorbing properties can be improved by choosing a material capable of absorbing higher shock forces or simply making a thicker layer of the same material. However, a thicker layer takes longer to return to its original shape form ready for the next impact, doesn't maintain its shape as well and can overheat. In one embodiment, the second layer is formed from multiple sub-layers. The provision of multiple sub-layers in the second layer can improve the shock-absorbing characteristics without the disadvantages of a singular layer of the same thickness. Reference herein to a second layer should thus be interpreted as potentially including multiple sub-layers and not limited to a singular unitary layer.

According to one embodiment, said second layer includes an elastomer layer, preferably polyurethane.

Preferably said elastomer has a Shore A scale value of 40 to 95.

Combining the properties of the first and second layers in the cushioning slide prevents high impact shock loads damaging or breaking the first layer and prevents the easily abraded second layer from being damaged or worn away from repeated sliding contact with the housing inner side walls.

Successfully combining the disparate materials of the first and second layer together requires a robust structure capable of withstanding the loads imposed during impacting operations. Preferably, the first and second layers are releasably attached together. Said releasable attachment may take the form of clips, screws, cooperative coupling parts, reverse countersinks or nesting. In one embodiment the releasable attachment may be a nesting arrangement such that the housing inner side walls hold the layers in place in a socket in the reciprocating component. In an alternative embodiment, the first and second layers are integrally formed, or bonded, or in some other way non-releasable. It will be appreciated however that by configuring the first layer to be detachable from the second layer, permits a layer's replacement after a period of wear without necessitating replacement of the whole cushioning slide.

When a compressive load is applied to the elastomer forming the second layer, the elastomer absorbs the shock by displacement of volume of the elastomer away from the point of impact. If the elastomer is surrounded by any rigid boundaries, this forces the direction of the elastomer volume displacement to occur at any unrestrained boundaries. Thus, if the elastomer is bounded by rigid surfaces on an upper and lower surface, the elastomer is displaced laterally between the rigid layers when under compression. However, if the elastomer is not able to be freely displaced, the elastomer acts like a confined incompressible liquid and consequently applies high, potentially destructive pressure on its surroundings. If the surrounding structures are sufficiently robust, the elastomer itself will fail.

To function effectively as a shock-absorber, the elastomer requires a void into which the displaced volume may enter under the effects of compression.

Thus, according to a further aspect of the present invention, said cushioning slide and/or a portion of said reciprocating component adjacent the cushioning slide is provided with at least one displacement void, configured to receive a portion of said second layer displaced during compression.

In one embodiment, said displacement void may by be formed in;
  said first layer;
  said second layer;
  said reciprocating component, or
  a combination of the above.

Although displacement voids may be formed in the first layer, these would typically require being machined into the structure of the first layer material (e.g. UHMWPE, Nylon, or Steel). Furthermore, although compression voids may be machined, or otherwise formed directly into the weight, care is required to avoid generating stress fractures from discontinuities in the weight's surface.

Therefore, forming at least one said displacement void in the second layer offers several advantages in ease of manufacturing and fitment. Thus, according to a further aspect of the present invention, said cushioning slide is formed with at least one displacement void. Preferably, said void is formed as;
  an aperture extending through the second layer;
  a repeating corrugated, ridged, beaded, saw-tooth and/or castellated pattern applied to at least one second layer side contacting the first layer and/or reciprocating component;
  a scalloped or otherwise recessed lateral peripheral portion,
  any combination or permutation of same.

Preferably, said first and second layers are substantially parallel. Preferably, said second layer is substantially parallel to an outer surface of said reciprocating component. Thus, the impact force will generally act normally to the majority of the second layer.

In one embodiment, the first and second layers are un-bonded to each other, preferably being held in mutual contact by clips, screws, threads, couplings, or the like. In contrast, attaching the elastomer to the first layer by adhesives or the like would prevent the elastomer from displacing laterally under compression except at the outer periphery. Consequently, not only would this reduce the shock absorbing capacity of the elastomer, it increases the likelihood of damage under high loads as the two layers act to tear apart the mutual bonding.

It has been found in practice that the high forces generated by the violent decelerations accompanying impacting operations can create up to a thousand fold increase over the force of gravity (1000 G) applied by the static weight and any component attached thereto. Thus, a cushioning slide weighing just 0.75 kg generates a shock load of 750 kg when subjected to 1000 G.

In one embodiment the present invention addresses the issue of withstanding such high G forces on the cushioning slides by locating the cushioning slides in a socket in the weight or reciprocating component.

According to one aspect, the cushioning slides are located on the reciprocating component in at least one socket, said reciprocating component having a lower impact face and at least one side face, said socket being formed with at least one ridge, shoulder, projection, recess, lip, protrusion or other formation presenting a rigid retention face between said lower impact face and at least a portion of the cushioning slide located in the socket on a side wall of the reciprocating component.

Alternatively, where said reciprocating component has a lower impact face and at least one side face, the cushioning slides are located on the reciprocating component on an outer surface of said side face, said side face being formed with at least one ridge, shoulder, projection, recess, lip, protrusion or other formation presenting a rigid retention face between said lower impact face and at least a portion of the cushioning slide located on said side wall of the reciprocating component.

In one embodiment, said retention face is positioned at a cushioning slide perimeter located about:
a lateral periphery of;
an inner aperture through, and/or
a recess in,
the cushioning slide.

The retention face provides the support to prevent the cushioning slide being detached from the reciprocating component under impact of the reciprocating component with the working surface/striker pin and/or the housing inner side walls. A retention face may be formed as outwardly or inwardly extending walls forming projections or recesses respectively, substantially orthogonal to the side walls of the reciprocating component surface.

A retention face may also be formed with a variety of retention features to also secure the cushioning slide to the reciprocating component side wall from the component of forces substantially orthogonal to the reciprocating component side walls. Such retention features include, but are not limited to, a reverse taper, upper lip, O-ring groove, threads, nesting or other interlocking feature to retain the cushioning slide attached to the reciprocating component.

In one embodiment, said retention face may be formed as walls forming at least one location projection passing through an aperture in at least the second layer, and optionally also the first layer.

In one embodiment, a locating portion of the first layer of the cushioning slide extends though said second layer into a recess in the reciprocating component side wall, said recess thereby presenting a retention face to said location portion.

It will be appreciated that employment of a location portion and/or a locating projection enables a cushioning slide to be positioned at a distal edge of the reciprocating component side wall, without a retention face surrounding the entire outer periphery of the cushioning slide.

The first layer may also be releasably secured to the second layer by a variety of securing features, including a reverse taper, upper lip, O-ring groove, threads, clips, nesting or other inter-locking or mutually coupling configurations.

In one embodiment, the second layer is an elastomer layer bonded directly to the surface of the reciprocating component side wall. As will be familiar to one skilled in the art, the surface of an elastomer such as polyurethane is highly adhesive and may be bonded to the steel weight reciprocating component through being formed in direct contact.

The size, location and shape of the cushioning slides are axiomatically dependant on the shape of the reciprocating component. In the case of a reciprocating component formed as rectangular/square cross-section block-shaped weight, used to impact a striker pin, it will be appreciated that any of the four side faces and corners may potentially come into contact with the housing inner side walls.

As the reciprocating component travels downwards, any deviation from a perfectly vertical orientation for the path of the reciprocating component and/or the orientation of the housing inner side walls can lead to mutual contact. The initial point of impact of such a contact is predominantly near one of the reciprocating component's 'apices', e.g. the corners between lateral faces. This impact applies a moment to the reciprocating component which causes the reciprocating component to rotate until impacting on the diametrically opposite apex. The cushioning slides are therefore preferably located towards the distal ends of the reciprocating component. As referred to herein the reciprocating component's 'apices' refer to the lateral points or edges of the reciprocating component such as the corners of a square or rectangular cross-section or the junctions between two faces of the reciprocating component.

Therefore, according to one aspect of the present invention, said first layer is formed to project beyond the outer periphery of the reciprocating component side walls adjacent the cushioning slide.

According to one aspect, said reciprocating component is square or rectangular in lateral cross-section, with substantially planar side walls connected by four apices, wherein a cushioning slide is located on at least two sides, two apices, and/or one side and one apex. Preferably, said cushioning slides are located on at least two pairs of opposing side walls and/or apices.

In addition to the lateral placement of the cushioning slides described above, the longitudinal location of the cushioning slides (with respect to the longitudinal axis of the elongate reciprocating component) is influenced by the operational characteristics of the apparatus. The appropriate longitudinal positioning of the cushioning slides can be subdivided into the following categories;
uni-direction, e.g. unitary hammer weights and weights used to impact striker pins;
bi-direction, e.g. unitary hammer weights, with impact tool ends at both ends of a reversible hammer and/or uni-direction hammers also used for levering and raking.

Impact hammers as described in WO/2004/035939 are also used for raking and levering rocks and the like with the hammer tip extending from the hammer housing. Such manipulation of the work surface is highly abrasive and contact by the work surface with any portion of the hammer weight with a cushioning slide will damage the cushioning slide and must be avoided. Consequently, when utilized in conjunction with a reversible hammer with two opposing tool ends, the cushioning slides need to be equidistantly placed sufficiently far away from the exposed hammer tool ends to avoid damage with the hammer in either orientation.

Embodiments of cushioning slides for use with a reversible hammer are preferably shaped as an elongate substantially rectangular/cuboid plate or blade configuration, with a pair of wide parallel longitudinal faces, joined by a pair of parallel narrow side faces. Such a configuration enables cushioned slides located on the short sides to readily extend sufficiently to provide cushioning for both the wide sides, in-effect wrapping around the sides of the weight. Such a configuration enables just two cushioning slides to be used to protect from impact on all four sides.

Thus, according to one aspect, the present invention includes at least two cushioning slides located on opposing sides of a rectangular cross-sectioned reciprocating component, said cushioning slides being configured and dimensioned to extend about a pair of adjacent apices.

A typical rock-breaking machine reciprocating cycle involves a lifting of a weight followed by the impact stroke. The weight drops in a housing along one or two housing side walls and strikes the rock surface or a striker pin and bounces back, potentially striking another side wall. It is this subsequent side-wall impact that generates a large amount of noise. As discussed above, the potential impact force and noise generated from an impact of the weight and the housing inner side walls increases with increasing separation between the weight and the housing inner side walls as the weight has greater distance to build up relative speed. However, decreasing the 'clearance' to the walls requires the housing and weight to be manufactured more precisely.

According to a further embodiment, said cushioning slides include at least one pre-tensioning feature for biasing the first layer toward the housing side walls.

In one preferred embodiment the pre-tensioning feature may be a pre-tensioning surface feature formed in or on at least one of:
the first layer lower surface;
the second layer upper surface;
the second layer lower surface,
a surface of a second layer sub-layer, and/or
the reciprocating component side wall surface adjacent the underside of the second layer, said pre-tensioning feature biasing apart the surface provided with at least one pre-tensioning feature and an adjacent surface contacting said pre-tensioning feature.

The pre-tensioning feature is preferably a surface feature shaped and sized such that it compresses more easily than said second layer.

In one embodiment, the pre-tensioning feature is formed from a material having a lower elastic modulus than said second layer material.

In another embodiment, the pre-tensioning feature is formed by shaping the second layer, or sub-layer thereof, to provide said bias, preferably being tensioned when the cushioning slide is assembled on the reciprocating component.

The pre-tensioning feature may thus bias the first layer toward the housing side walls and axiomatically space the reciprocating component from the housing side walls. The pre-tensioning features may thus eliminate or at least reduce the clearance between the cushioning slides and the housing side walls, thereby reducing potential lateral impact noise. The pre-tensioning feature also compensates for reduction in the thickness of the first layer due to wear. The pre-tensioning feature may also assist in centralising the reciprocating component when it is not plumb or is travelling through a housing which has a variable side clearance.

Preferably, said reciprocating component with cushioning slides incorporating at least one pre-tensioning feature is configured and dimensioned such that at least one said cushioning slide is in continuous contact with the housing inner side walls during reciprocation of the reciprocating component. Preferably, said pre-tensioning feature is elastic.

In one embodiment a pre-tensioning feature may be pre-tensioned when the reciprocating component is laterally equidistantly positioned within the housing inner side walls.

Thus, the outer surface of the first layer of the cushioning slide is biased into light contact with the housing inner side walls when the housing is substantially vertical. In use when the reciprocating component reciprocates, any lateral component of a force experienced by the reciprocating component acts to compress the pre-tensioning feature. The pre-tensioning feature is thus compressed to a point where any additional compressive force causes the elastomer of the second layer to deflect as discussed above in the earlier embodiments. By appropriate choice of the shape and bias of the pre-tensioning feature and the second layer elastomer, the first layer may be maintained in contact with the housing inner side walls with sufficient bias to prevent becoming detached during reciprocation, but without hindering the shock-absorbing capacity of the second layer.

In one embodiment, said pre-tensioning feature includes spikes, fins, buttons, or the like formed into the second layer.

According to a yet further aspect of the present invention, said cushioning slides include a wear buffer. If for example, an impact hammer were used for a prolonged period at an appreciable inclination, a force results on the lowermost housing inner side wall and the cushioning slides facing the lower sidewall. Such prolonged use may cause the elastomer in the affected cushioning slides to become overstressed and potentially fail. The elastomer is able to recover its resilient capabilities if the intensity and/or duration of the overstressing do not exceed certain limits. Consequently, the wear buffer provides a means of preventing compression of the second layer elastomer beyond a predetermined threshold.

In one embodiment, the wear buffer is provided by said retention face configured as walls forming at least one location projection passing through apertures in the second layer and first layer. As discussed above, a location projection is a means of securing the cushioning slide to the reciprocating component side walls under impact forces. However, it also provides the capacity for being configured as a wear buffer, whereby after deflection of the second layer elastomer has reduced the thickness of the elastomer beyond a predetermined point, the location projection extends through the aperture in the first layer sufficiently to contact an inner housing side wall. The steel housing side wall thus bears on the location projection preventing any further compression of, of damage to, the elastomer second layer. Although this will result in some increased noise generation it will be substantially less than if there was no buffer at all.

In another embodiment, the cushioning slide is configured with dimensions such that when the second layer is compressed past its normal operating limits (typically 30% for a typical elastomer) the surface of the reciprocating component surrounding the recess containing the cushioning slide bears on the housing inner side walls.

According to a further aspect, the present invention provides a cushioning slide for attachment to a reciprocating component in an apparatus;
said reciprocating component being movable along a reciprocation path in at least partial contact with at least one containment surface of said apparatus, said cushioning slide formed with an exterior first layer and an interior second layer, wherein;
said first layer is formed with an exterior surface configured and orientated to come into at least partial contact with said containment surface during said reciprocating movement of the component, said first layer being formed from a material of predetermined low friction properties, and said second layer is formed with at least one surface connected to said first layer and at least one interior surface connectable to said reciprocating component, said second layer being formed from a material of predetermined shock absorbency properties.

According to a further aspect, there is provided a method of assembling a reciprocating component, said method including the step of attaching an aforementioned cushioning slide to the reciprocating component.

As stated previously, the present invention is not limited to impact hammers or other rock-breaking apparatus and may be applied to any apparatus with a reciprocating component involving multiple mutual collisions between parts of the apparatus.

The present invention thus offers significant advantages over the prior art in terms of improvement in impacting performance, and a reduction in manufacturing cost, noise and maintenance costs.

It has been found the present invention achieves a noise reduction of 15 dBA on the applicant's gravity drop hammer. This gives a highly significant operational improvement. The earlier drop hammer generated 90 dBA at 30 m in use, while the present invention generates only 75 dBA at 30 m. Moreover, the widespread legislative noise limit for operating such machinery in the proximity of urban areas of 55 dBA which was previously reached at 1700 m is now only reached at 300 m—a more than 5 fold improvement.

The typical frictional power losses of an impact hammer weight are approximately 12-15%. The co-efficient of friction of steel on steel is 0.35, whereas UHMWPE or Nylon on steel is less than 0.20. Thus, the present invention utilising UHMWPE as the cushioning slide first layer has been found to reduce these losses by approximately 40% to 7-9%. The hammer drive mechanism is thus able to lift a 3-5% heavier weight and, in the case of a drive down hammer, drive the weight downwards with 3-5% less losses, with a commensurate improvement in demolition effect.

The reduction in shock load applied to the apparatus because of the shock absorbing second layer enables either an extension in the working life of the apparatus or the ability to manufacture a housing with a lighter, cheaper construction.

The use of the aforementioned cushioning slide also enables apparatus to be manufactured to wider tolerances, thereby reducing costs further. This is achievable due to the change from steel on steel contact between the weight and the housing weight guide (housing inner guide walls) to a low-friction first layer (e.g. UHMWPE) contact with the steel housing weight guide. The steel/steel contact required a high level of machining accuracy and low tolerances to minimise the shock and noise levels as far as possible. Furthermore, the housing casings are typically un-machined weldments which are difficult to manufacture to exact tolerances, and if incorrect necessitate machining of the weight which is difficult and time consuming and results in requirements for non-standard parts.

In contrast, the use of the aforementioned cushioning slide allows the weight to be manufactured to rough tolerances, or even rough cast or forged before accurately machining a relatively small part of the weight sides for placement of the cushioning slides. Any discrepancy in the necessary width of the weight can be accommodated simply be adjusting the thickness of the cushioning slide, typically via adjustment of the first layer.

BRIEF DESCRIPTION OF DRAWINGS

Further aspects and advantages of the present invention will become apparent from the following description which is given by way of example only and with reference to the accompanying drawings in which:

FIG. 5a shows an exploded enlarged plan section view of a weight and cushioning slides according to the embodiment shown in FIG. 2;

FIG. 5b shows an enlarged plan section view of a weight and cushioning slides shown in FIG. 5a;

FIG. 5c shows a plan section view of a weight and cushioning slides in FIG. 5c;

FIG. 7a shows a front elevation of the hammer weight and cushioning slides according to the embodiment shown in FIG. 1;

FIG. 7b shows a front elevation of an alternative hammer weight and cushioning slides to the embodiment shown in FIG. 7a;

FIG. 8a shows a front elevation of the hammer weight of the embodiment shown in FIG. 1 impacting a working surface;

FIG. 8b shows a side view of the embodiment shown in FIG. 8a;

FIGS. 13a-f shows a partial plan section of the hammer weight of FIG. 1 with a sixth, seventh, eighth, ninth, tenth and eleventh securing features respectively;

FIG. 14a shows an enlarged exploded section view of a cushioning slide according to a further embodiment;

FIG. 14b shows an assembled view of the cushioning slide in FIG. 14a;

FIG. 15a shows an enlarged exploded plan section view of cushioning slides fitted to the weight of FIG. 2;

FIG. 15b shows an enlarged assembled view of the cushioning slides fitted to the weight of FIG. 15a;

FIG. 19a shows an exploded diagram of a cushioning slide according to another embodiment of the present invention, and FIG. 19b shows an assembled diagram of the cushioning slide of FIG. 19a.

DETAILED DESCRIPTION OF THE INVENTION

Figure 1:
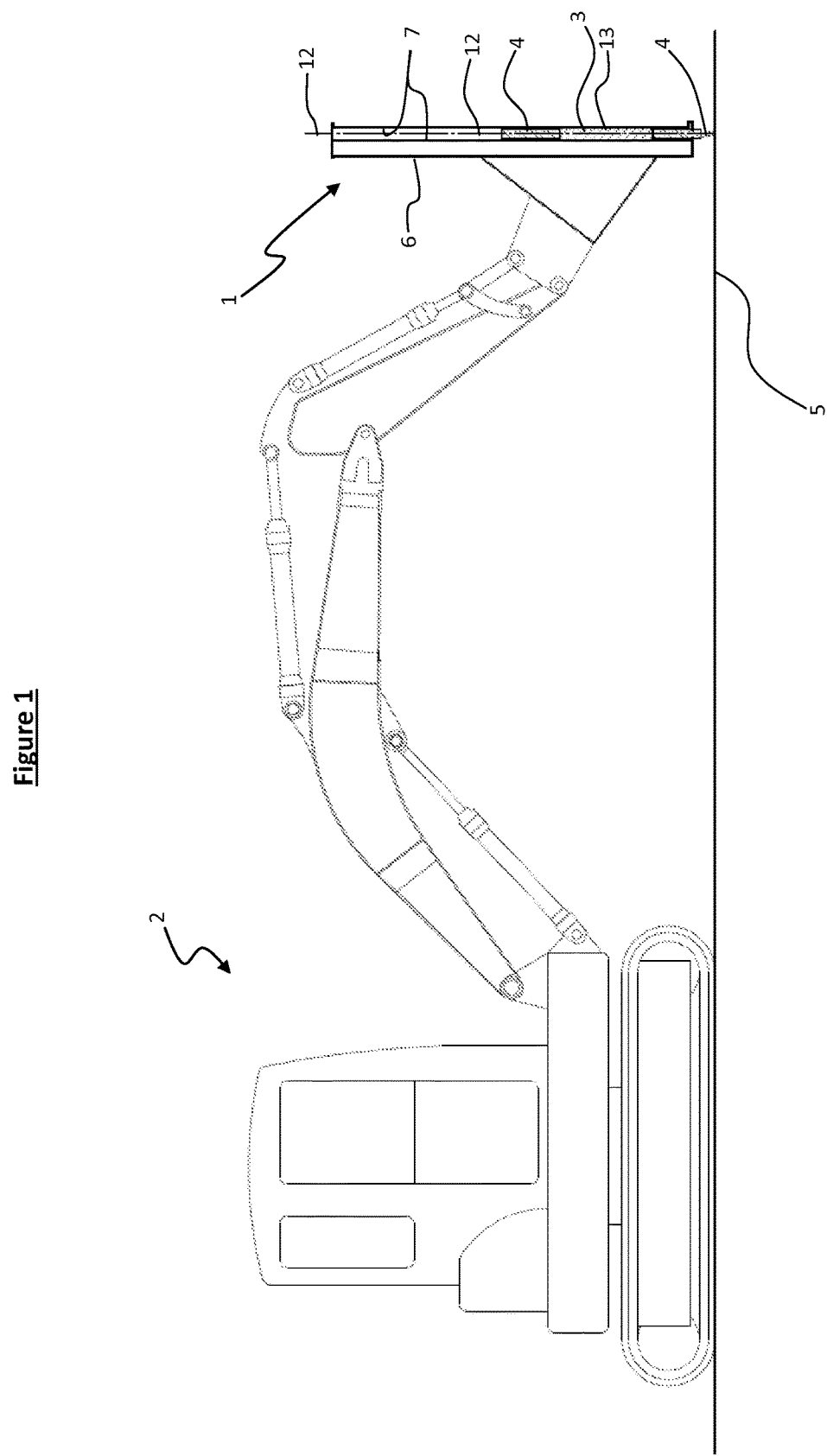
FIG. 1 shows a side elevation section of a first embodiment of the present invention of an apparatus in the form of a small impact hammer attached to a small excavator.

| Reference numerals for FIGS. 1-19 |
|---|
| (1) - impact hammer |
| (2) - small excavator |
| (3) - hammer weight |
| (4) - tool end |
| (5) - working surface |
| (6) - housing |
| (7) - housing inner side walls |
| (8) - wide side walls |
| (9) - narrow side walls |
| (10) - upper distal face |
| (11) - lower distal face |
| (12) - impact axis |
| (13) - cushioning slides |
| (14) - first layer |
| (15) - second layer |
| (15a-d) - second layer |
| (16) - exterior surface - first layer |
| (17) - outer surface - second layer |
| (17a-d) - outer surface - second layer |
| (18) - underside - first layer |
| (19) - interior surface -second layer |
| (19a-d) - interior surface -second layer |
| (20) - longitudinal apices |
| (21) - weight surface under second layer |
| (22) - displacement void |
| (22a-d) - displacement void |

| Reference numerals for FIGS. 1-19 |
|---|
| (23a-23e) - securing feature |
| (23f-23k) - securing feature |
| (23m) - securing feature |
| (24) - socket |
| (25) - retention face |
| (26) - location projections |
| (27) - locating recesses |
| (28) - aperture - second layer |
| (29) - aperture - first layer |
| (30) - locating portion |
| (101) - large impact hammer |
| (102) - large excavator |
| (103) - weight |
| (104) - striker pin |
| (105) - working surface |
| (106) - housing |
| (107) - housing inner side walls |
| (108) - wide side walls |
| (109) - narrow side walls |
| (110) - upper distal face |
| (111) - lower distal face |
| (112) - linear impact axis |
| (113) - cushioning slides |
| (114) - first layer |
| (115) - second layer |
| (116) - exterior surface - first layer |
| (117) - outer surface - second layer |
| (118) - underside - first layer |
| (119) - interior surface -second layer |
| (120) - longitudinal apices |
| (121) - weight surface under second layer |
| (122) - displacement void |
| (123) - securing feature |
| (124) - socket |
| (125) - retention face |
| (126) - location projection |
| (127) - locating recess |
| (128) - aperture - second layer |
| (129) - aperture - first layer |
| (130) - locating portion |
| (131) - tensioning features |
| (213) - cushioning slide |
| (214) - first layer |
| (215) - second layer |
| (216) - first layer exterior surface |
| (217) - second layer outer surface |
| (218) - first layer interior surface |
| (219) - second layer interior surface |
| (231) - upper sub-layer |
| (232) - intermediate sub-layer |
| (233) - lower sub-layer |
| (234) - lower sub-layer recess |
| (235) - lower layer side walls |

Figure 2:
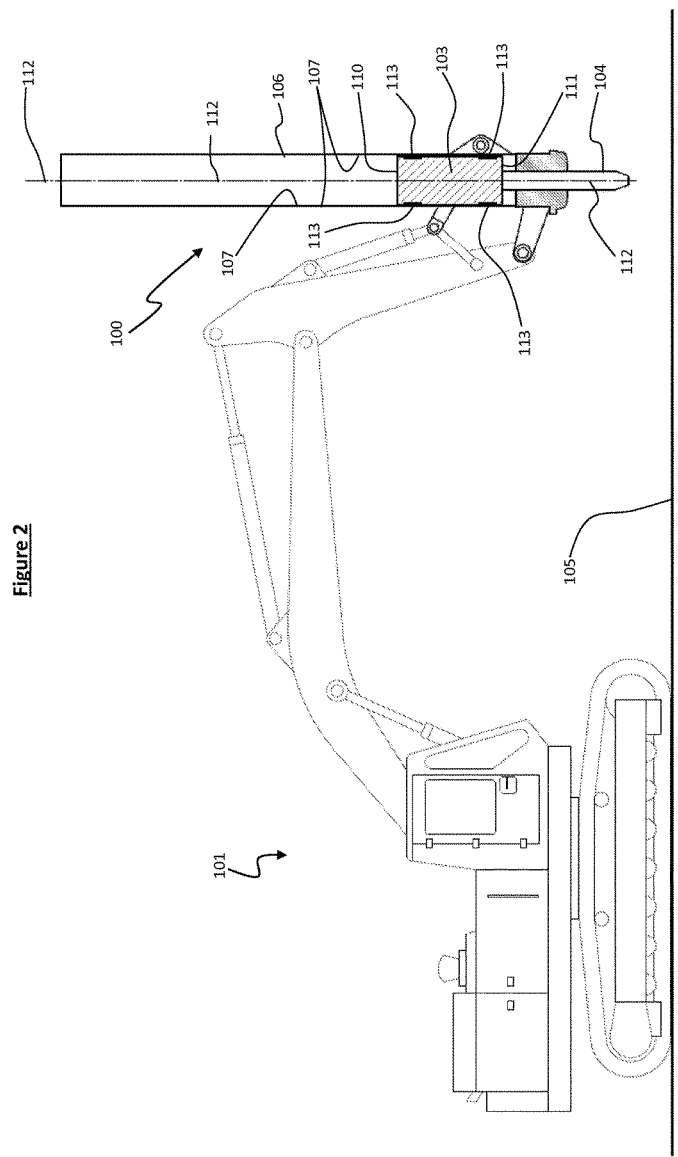
FIG. 2 shows a side elevation section of second embodiment of the present invention of an apparatus in the form of a large impact hammer attached to a large excavator.

FIGS. 1-2 show apparatus according to separate embodiments of the present invention being in the form of impact hammers with weights fitted with cushioning slides.

FIG. 1 shows a first embodiment of the present invention of an apparatus in the form of a small impact hammer (1) fitted to a small excavator (2).

The impact hammer (1) includes;
a lifting and/or reciprocating mechanism (not shown),
a reciprocating component in the form of a weight configured as a unitary hammer weight (3) with an integral tool end (4) for striking a working surface (5) and
a housing (6) attached to the excavator (2) and partially enclosing the hammer weight (3) with a containment surface in the form of housing inner side walls (7).

FIG. 2 shows an alternative apparatus embodiment in the form of a large impact hammer (100) fitted to a large excavator (102).

The impact hammer (100) includes;
a lifting mechanism (not shown)

a reciprocating component in the form of a weight (103)
a housing (106) attached to the excavator (102) and partially enclosing the hammer weight (103) with a 'containment surface' or 'housing weight guide' provided in the form of a housing inner side walls (107).

The lifting mechanism raises the weight (103) within the housing weight guide (107), before being dropped onto a striker pin (104), which in turn impacts the working surface (105).

Although the present invention may be implemented with any apparatus with at least one reciprocating component coming into repeated contact with the apparatus, its application to impact hammers as described herein illustrates the salient issues and advantages applicable to other applications.

Figure 3:
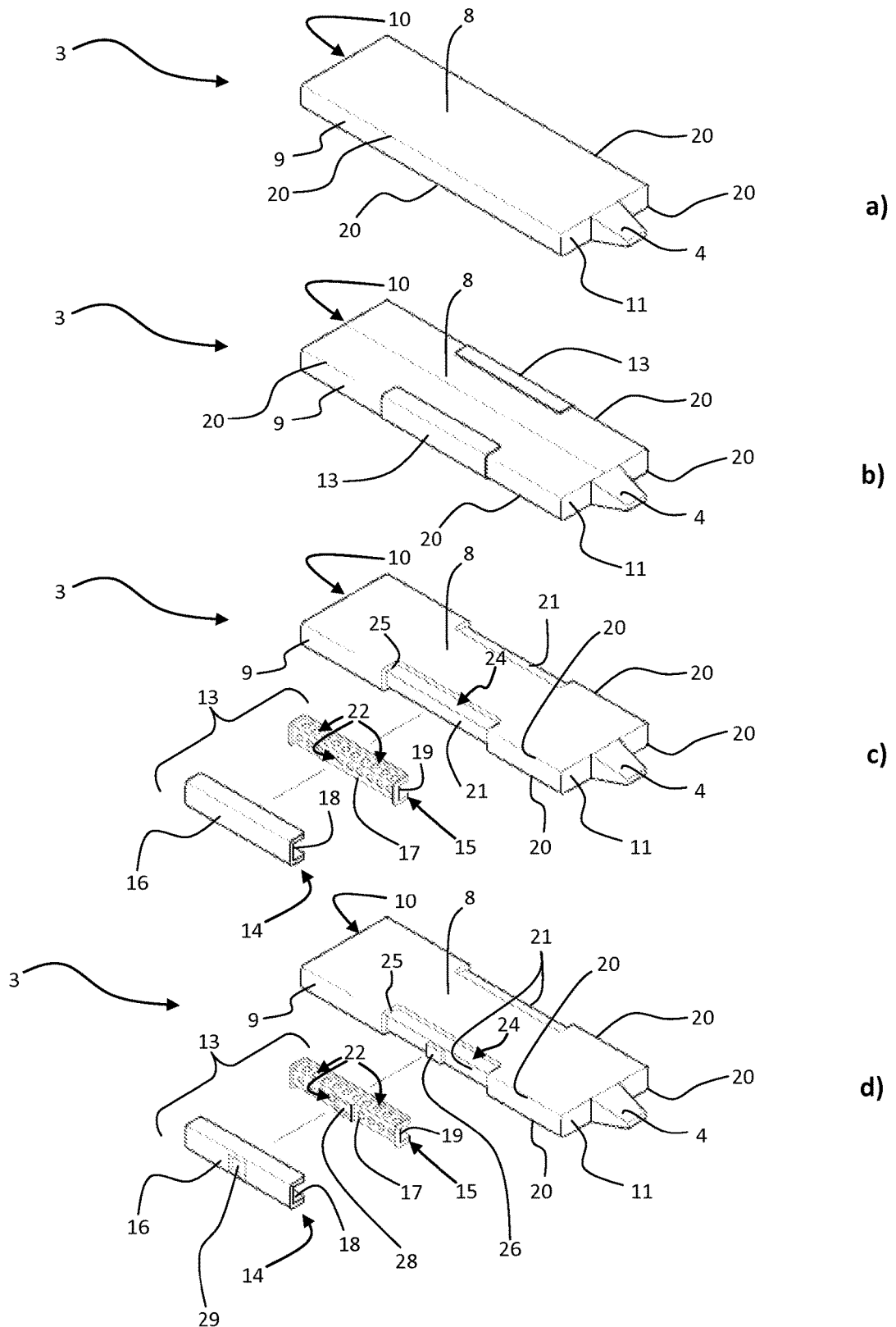
FIGS. 3a-d) shows a perspective view of a hammer weight and cushioning slides according to the embodiment shown in FIG. 1.

Regarding the hammer (1) shown in FIGS. 1 and 3, the hammer weight (3) is an elongate substantially rectangular/cuboid plate or blade configuration. The hammer weight (3) is of rectangular lateral cross section and composed of a pair of parallel longitudinal wide side walls (8), joined by a pair of parallel short side walls (9), with opposing upper and lower distal faces (10,11) each provided with tools ends (4). The hammer shown in FIG. 3 only has one tool end (4). The symmetrical shape of the hammer weight (3) enables the tool ends (4) to be exchanged when one is worn. The hammer weight (3) is removed from the housing (6) and re-inserted with the position of the tool ends (4) reversed.

In operation, the hammer weight (3) reciprocates about a linear impact axis (12) passing longitudinally through the geometric centre of the hammer weight (3). The hammer weight (3) is raised upwards along the impact axis (12) by the lifting mechanism to its maximum vertical height, prior to being released, or driven downwards back along the impact axis (12) until impacting with the working surface (5).

FIG. 3b) shows the hammer weight (2) of FIG. 3a) with the addition of a pair of centrally located cushioning slides (13). FIG. 3 c) is an exploded diagram showing the components of the cushioning slides (13), namely;
a first layer (14) formed from a material of predetermined low friction properties such as UHMWPE, Nylon, PEEK or steel, and
a second layer (15) formed from a material of predetermined shock absorbing properties such as an elastomer, e.g. polyurethane.

The first layer (14) is formed with an exterior surface (16) configured and orientated to be the first contact point between the side walls (8, 9) and the housing inner side walls (7). The second layer (15) is located between the first layer (14) and the weight side wall (8, 9) and formed with an outer surface (17) connected to the underside (18) of the first layer (14) and an interior surface (19) connected to the weight side walls (8, 9).

The first and second layers (14, 15) are substantially parallel to each other and to the outer surface of the sidewalls (8, 9). Although the cushioning slides (13) may be located in a variety of positions on the side walls (8, 9), the narrow width of the short side walls (9) in the embodiment shown in FIG. 3 allows a single cushioning slide (13) to be used that spans the full width of the narrow side wall (9) between adjacent longitudinal apices (20) and extending to part of the opposing wide side walls (8).

Figure 4:
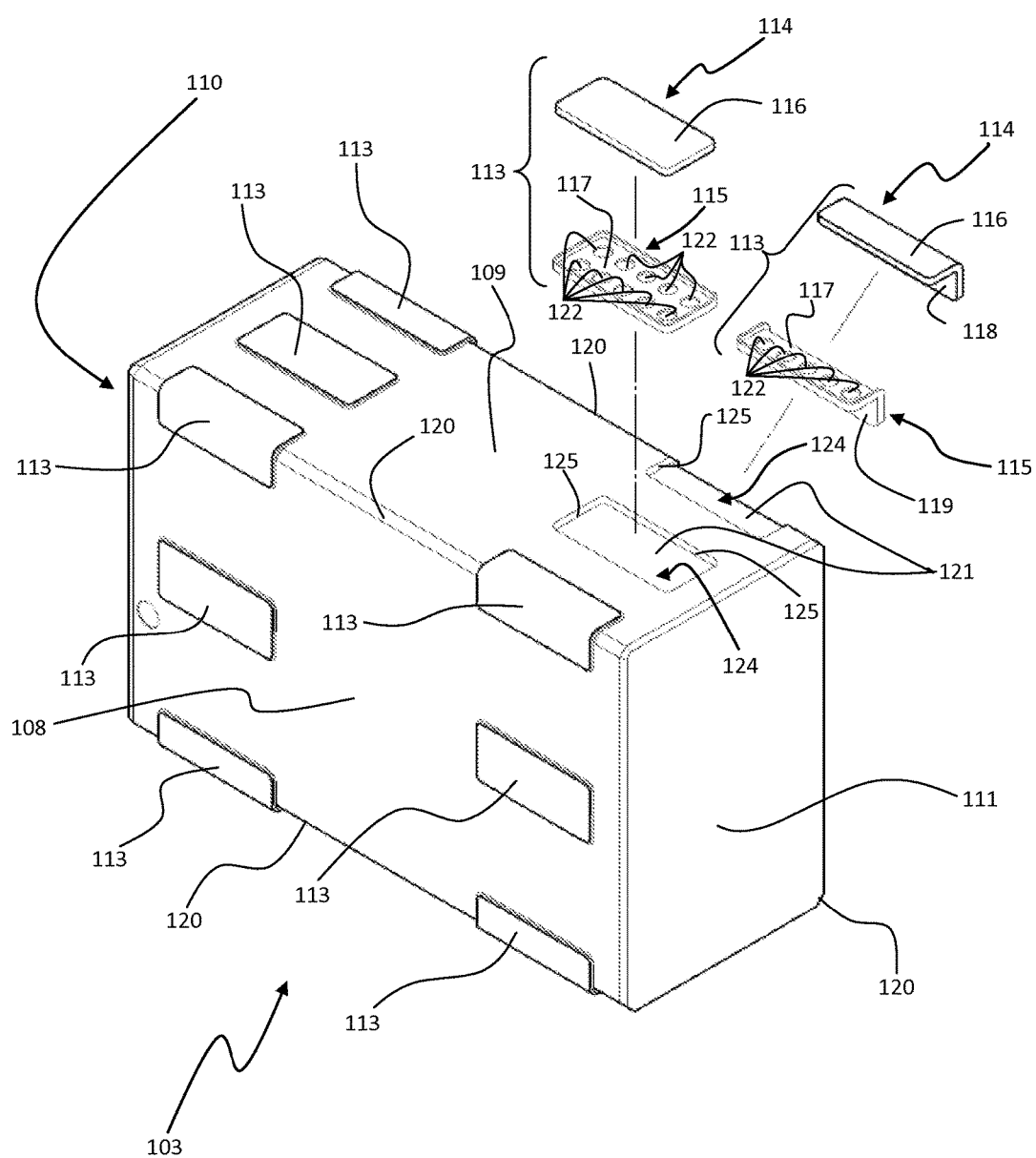
FIG. 4 shows a perspective view of a weight and cushioning slides according to the embodiment shown in FIG. 2.

In the alternative embodiment shown in FIGS. 2 and 4, the weight (103) differs from the embodiment of FIGS. 1 and 3 in;
size—a significantly larger mass/weight;
shape—block shaped rather than blade, and
upper and lower ends—planar, not fitted with tool ends (4).

As the weight (103) is used to impact a striker pin (104), there is no need for a tool end or the ability to be reversed. The weight (103) is a substantially cuboid block of rectangular cross section with a pair of parallel longitudinal wide side walls (108), joined by a pair of parallel shorter side walls (109), with an opposing upper and lower distal faces (110, 111).

In operation, the hammer weight (103) reciprocates about a linear impact axis (112) passing longitudinally through the geometric centre of the hammer weight (103). The hammer weight (103) is raised upwards along the impact axis (112) by the lifting mechanism to its maximum vertical height, prior to being released, falling under gravity along the impact axis (112) until impact with the striker pin (104). The weight (103) is fitted with a plurality of cushioning slides (113) positioned about the side walls (108, 109).

FIGS. 4 and 5a show an exploded view of the components of the cushioning slides (113), namely;
a first layer (114) formed from a material of predetermined low friction properties such as UHMWPE, PEEK, steel and
a second layer (115) formed from a material of predetermined shock absorbing properties such as elastomer, e.g. polyurethane.

FIGS. 5b and 5c show the assembled cushioning slides (113) fitted to the weight (103) on both the planar side walls (108, 109) and on the four longitudinal apices (120) of the weight (103)

The first layer (114) is formed with an exterior surface (116) configured and orientated to be the first contact point between the side walls (108,109) and the housing inner side walls (107). The second layer (115) is located between the first layer (114) and the weight side wall (108,109) and formed with an outer surface (117) connected to the underside (118) of the first layer (114) and an interior surface (119) connected to the weight side walls (108,109). The first and second layers (114,115) are substantially parallel to each other and to the outer surface of the sidewalls (108,109).

Figure 6:
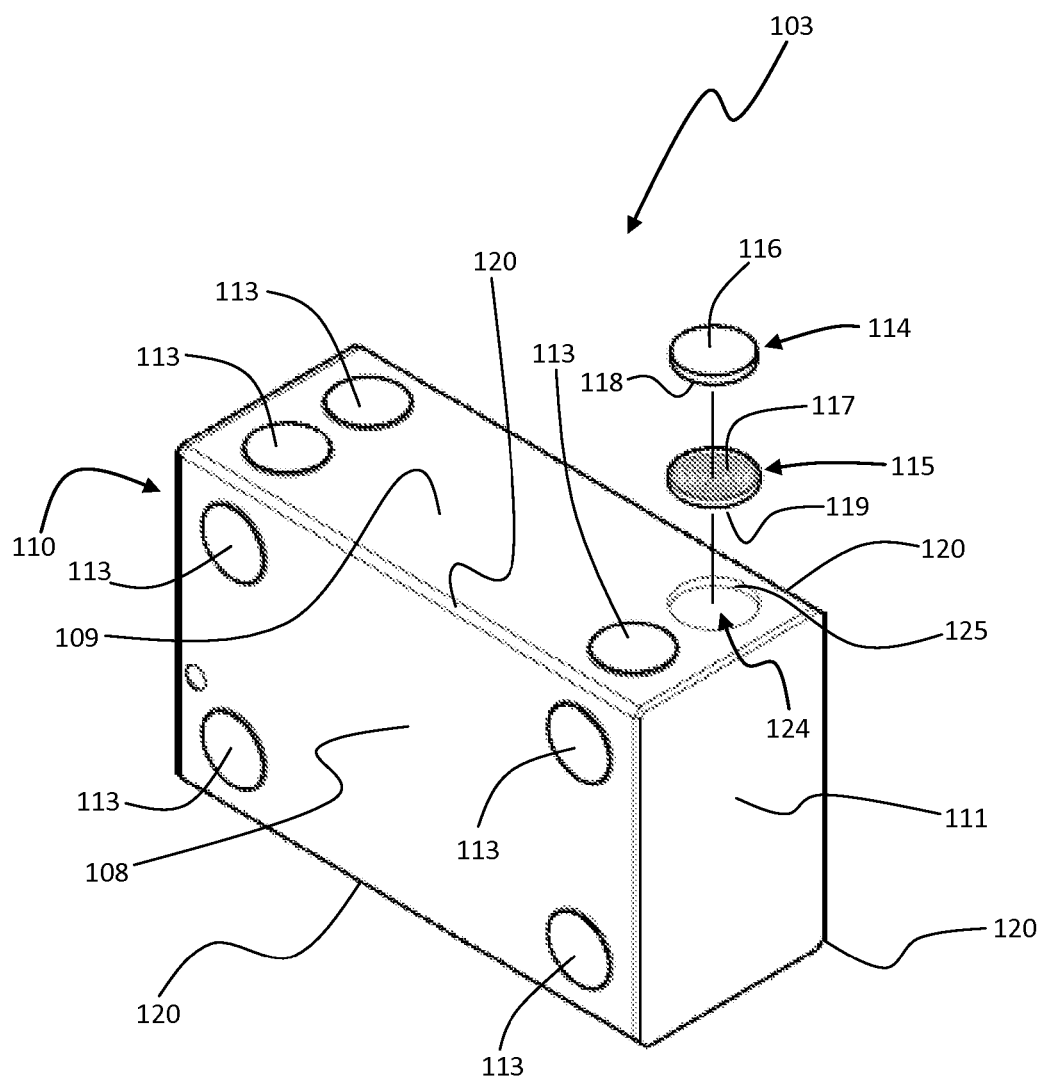
FIG. 6 shows a perspective view of a weight according to the embodiment shown in FIG. 2 with a further embodiment of cushioning slides.
Figure 7:
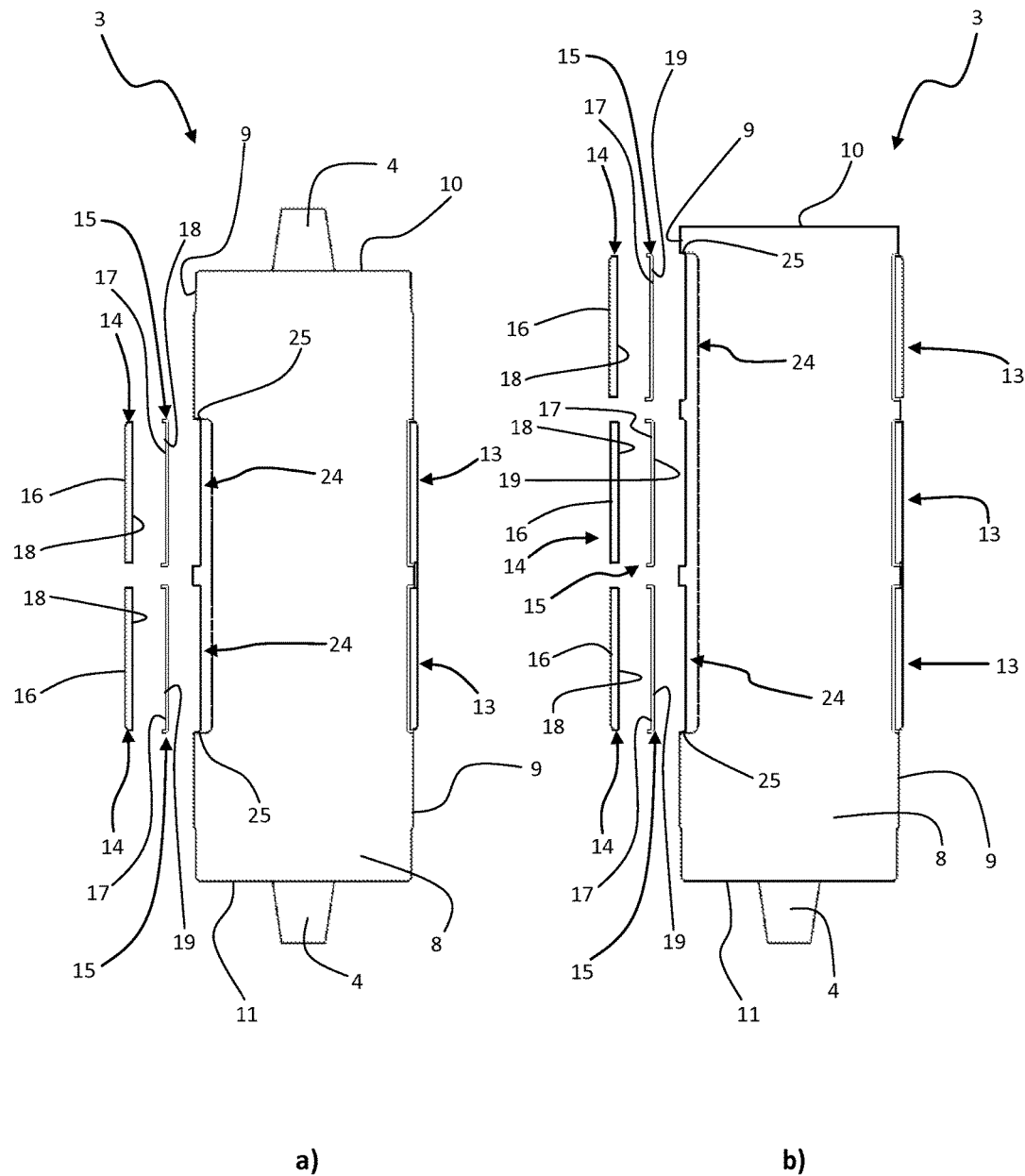
Figure 8:
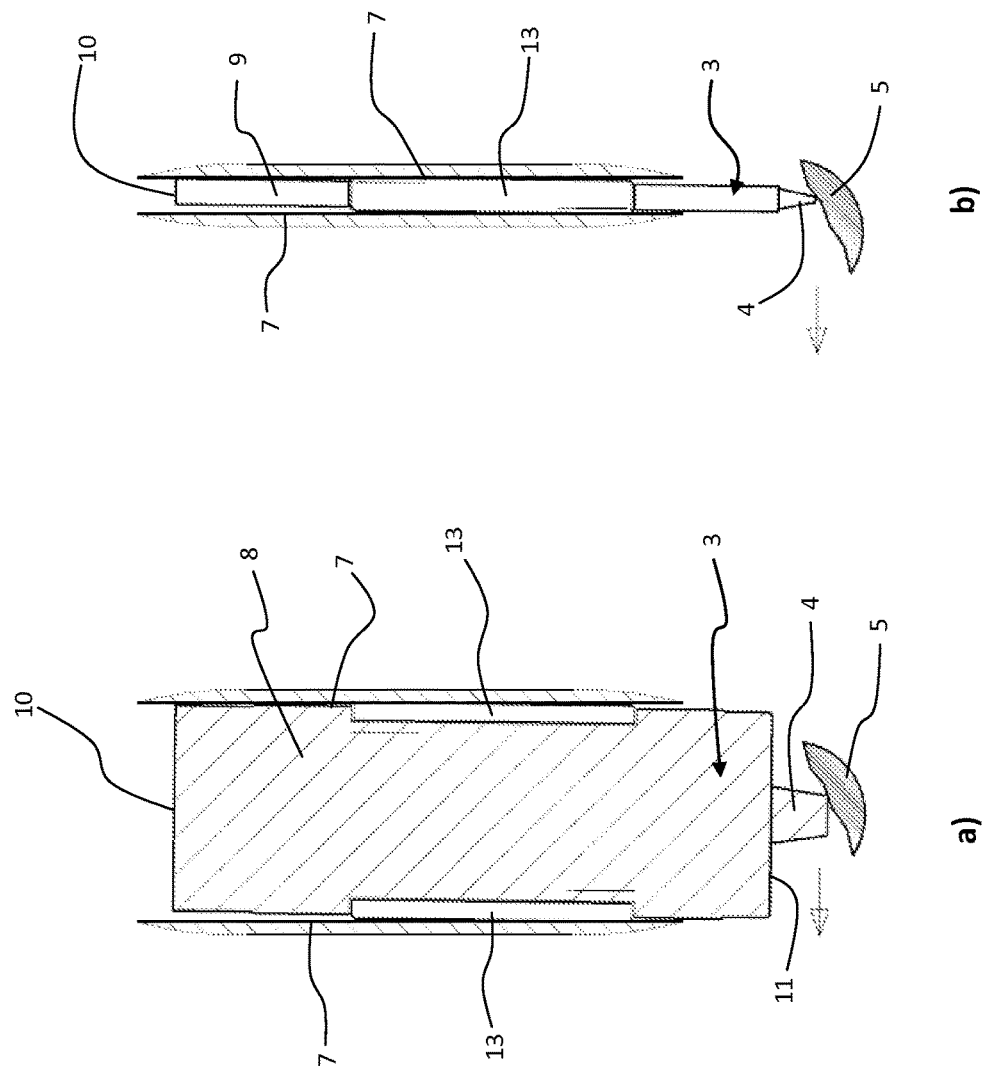

The cushioning slides (113) placed on the sidewalls (108, 109) in the embodiment of FIGS. 2, 4 and 5 are rectangular plates in outline, however alternative shapes may be utilized such as the circular cushioning slides (113) shown in FIG. 6.

FIGS. 7a and 7b show two further configurations of the hammer weight (3) shown in FIGS. 1 and 3. FIG. 7a shows the bidirectional hammer weight (3) with twin identical tool ends (4), capable of being reversed when one tool end (4) becomes worn. The hammer weight (3) is also capable of being used for levering and raking rocks and the like, whereby the hammer weight (3) is locked from movement along the impact axis (12) with the side walls (8, 9) adjacent lower distal face (11) projecting outside beyond the housing (6) to perform the levering. Any cushioning slides (13) directly exposed to the effects of the levering and raking would be damaged. Thus, the cushioning slides (13) are longitudinally positioned away from both distal ends (10, 11) of the hammer weight (3).

FIG. 7b shows a uni-directional hammer weight (3), with only one tool end (4), which is also capable of levering and raking, though without being reversible. Consequently, the cushioning slides (13) are asymmetrically arranged longitudinally, with additional cushioning slides positioned near the upper distal surface (10).

Impact hammers (including the impact hammers (1, 100) described above) are configured to raise and lower the weight with the minimum obstruction or resistance from the hammer housing (6, 106). The hammer (3, 103) is only directly connected to the lifting mechanism (not shown) and not the housing inner side walls (7, 107). Thus, as the weight (3, 103) travels upwards or downwards, any deviation from a perfectly vertical impact axis (12, 112) for the path of the weight (3, 103) and/or the orientation of the housing inner side walls (7, 107) can lead to mutual contact.

An initial point of impact is predominantly at one of the weight apices (20, 120) which applies a corresponding moment to the weight (3, 103), causing the weight (3, 103) to rotate until impact on the diametrically opposite apex (20, 120) unless the weight (3, 103) reaches the top or bottom of its reciprocation path first. The impact of the weight (3, 103) on the working surface (5, 105) may also generate lateral reaction forces if the working surface (5, 105) is not orthogonal to the impact axis (12, 112), and/or, if the working surface (5, 105) does not fracture on impact.

FIGS. 8a-b show the hammer weight (3) impacting an uneven working surface (5), which generates a commensurate lateral reaction force away from the working surface (5). The moment induced in the weight (3) by the lateral reaction force causes a rotation of the weight (3) away from the working surface (5). This rotation may be substantially parallel to the plane of the wide side walls (8) (as shown in FIG. 8a) or substantially parallel to the plane of the narrow side walls (9) (as shown in FIG. 8b) or any combination of same. The rotating effect of the contact causes diametrically opposite portions of the weight (3) to come into contact with the weight housing guide (7).

The hammer weight (3) shown in FIGS. 8a, 8b represents a reversible, bi-directional hammer weight (3) suitable for raking and levering. Consequently, the cushioning slides (13) are located centrally along the longitudinal side walls (8, 9) to avoid damage during levering/raking. However, the cushioning slide (13) is sufficiently dimensioned to ensure the outer surface (16) of the first layer (14) comes into contact with the surface of the housing weight guide (7) before the distal portion of the apices (20).

Figure 9:
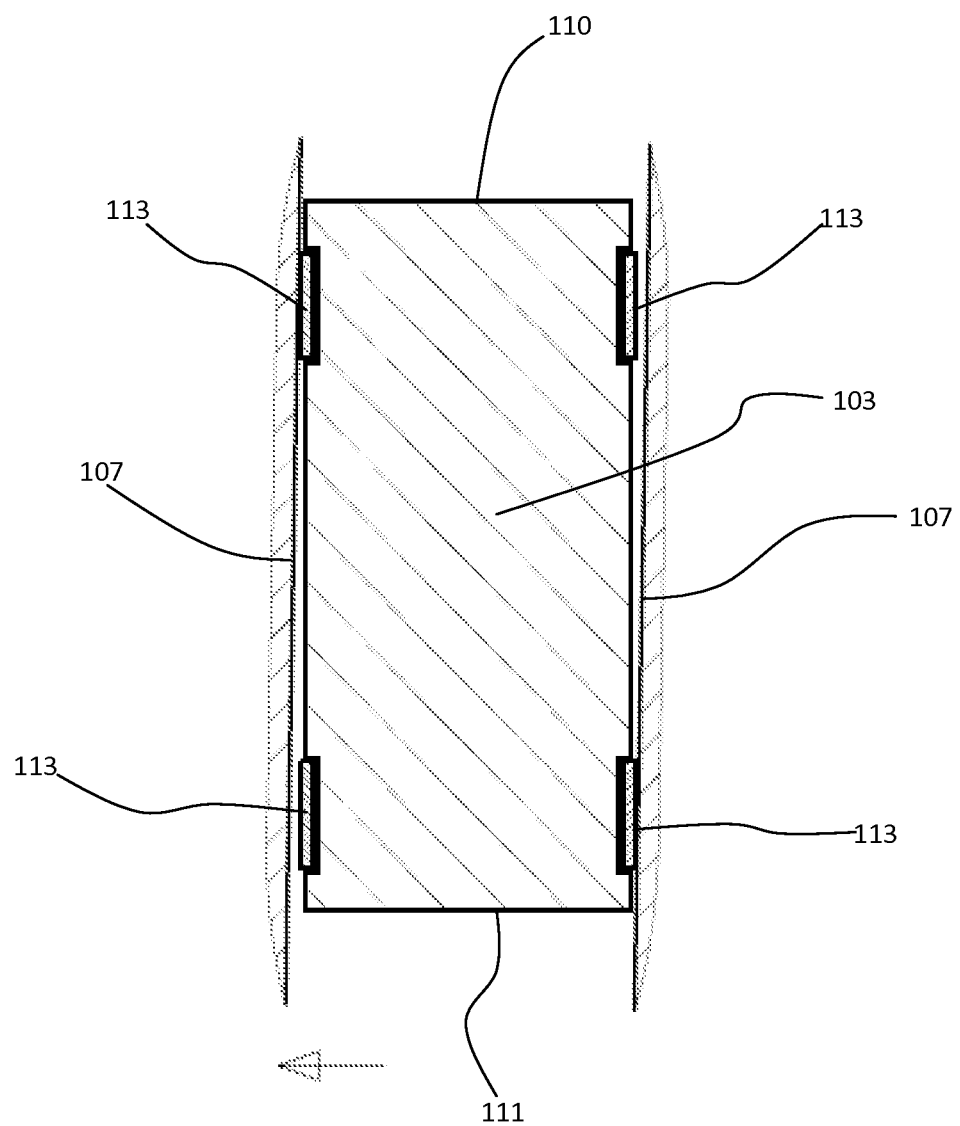
FIG. 9 shows a front elevation of the hammer weight of the embodiment shown in FIG. 2.

FIG. 9 shows a comparable situation with the weight (103) of the embodiment of FIGS. 2, 4, 5 impacting the (housing inner side walls (107) during its downward travel. Again, the impact of the lower distal portion of the weight side wall (109) causes a moment-induced rotation in the weight (103) with a corresponding impact on the upper distal portion of the opposing side wall (109). The cushioning slides (113) on the weight (103) are thus positioned at these points of contact.

When the weight (3, 103) impacts the housing inner side walls (7, 107) and a compressive load is applied to the elastomer forming the second layer (15, 115), the shock is absorbed by displacement of volume of the elastomer (15, 115) away from the point of impact.

Any rigid boundaries surrounding the elastomer (15,115) restrict the displacement of the elastomer (15, 115) to occur at any unrestrained boundaries. In the preceding embodiments where the elastomer (15, 115) is bounded by the rigid first layer underside (18, 118) and the rigid upper surface (21, 121) of the weight (3, 103) underneath the elastomer (15, 115), the elastomer (15, 115) is displaced laterally substantially parallel with the surface of the weight (3, 103) under compression.

The embodiment shown in FIGS. 1-4 provides the elastomer (15, 115) with displacement voids (22, 122) into which the displaced volume may enter under the effects of compression. As shown in FIG. 3c, the cushioning slide (13) incorporates a series of circular displacement voids (22) in the second layer (15), extending substantially uniformly along the second layer (15) on three sides such that the series of voids (22) extends over the weight surfaces (21) on each wide side wall (8) and the corresponding narrow side wall (9).

The embodiment in FIG. 4 also utilises a corresponding configuration of circular displacement voids (122) in the second layer (115) of the cushioning slide (113).

Figure 10:
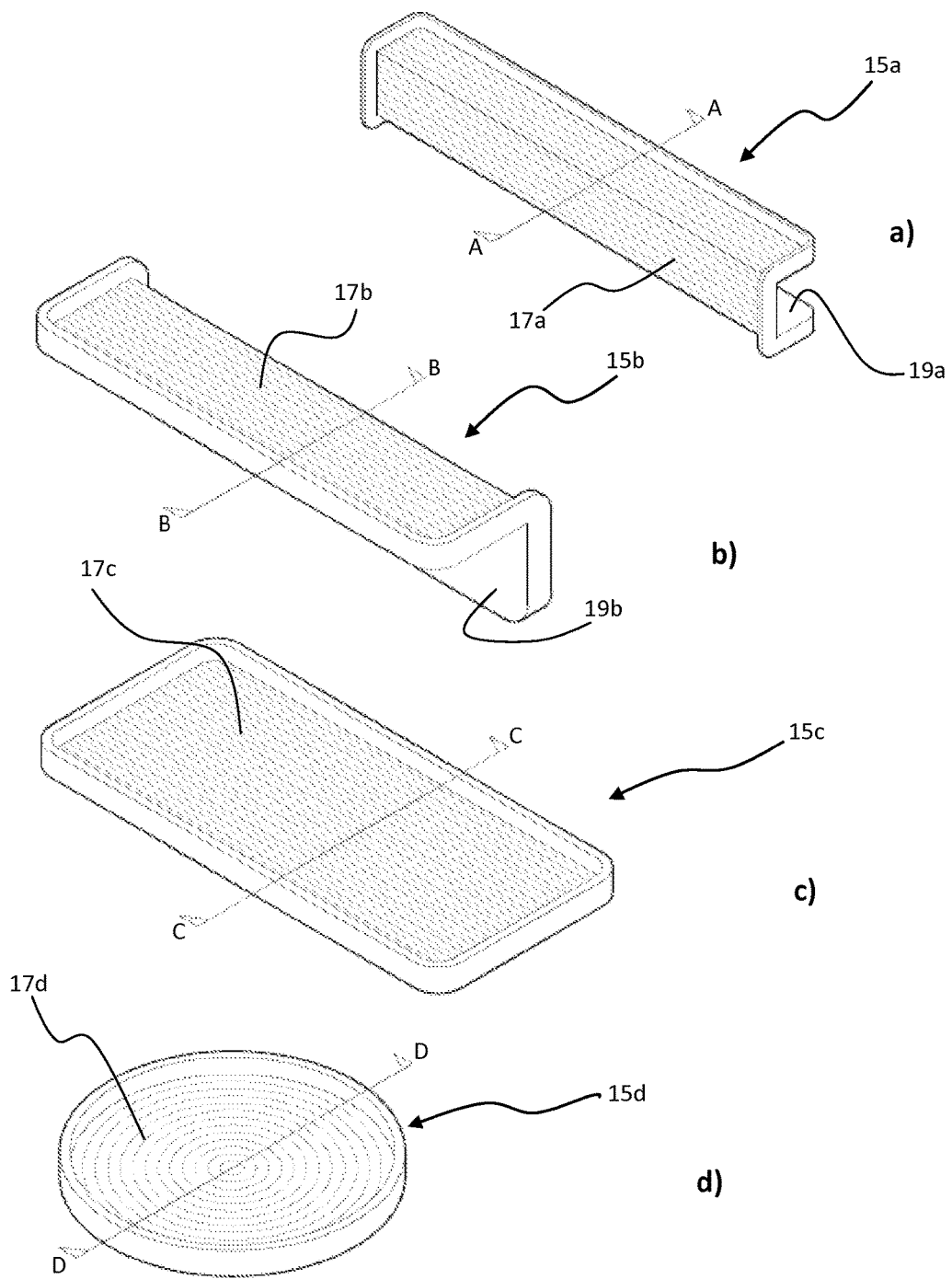
FIG. 10a shows an isometric view of a cushioning slide for the hammer weight shown in FIG. 1.
FIG. 10b shows an isometric view of a cushioning slide for an apex of the weight shown in FIG. 2.
FIG. 10c shows an isometric view of a rectangular cushioning slide for the side wall of the weight shown in FIG. 2.
FIG. 10d shows an isometric view of a circular cushioning slide for the side wall of the weight shown in FIG. 2.
Figure 11:
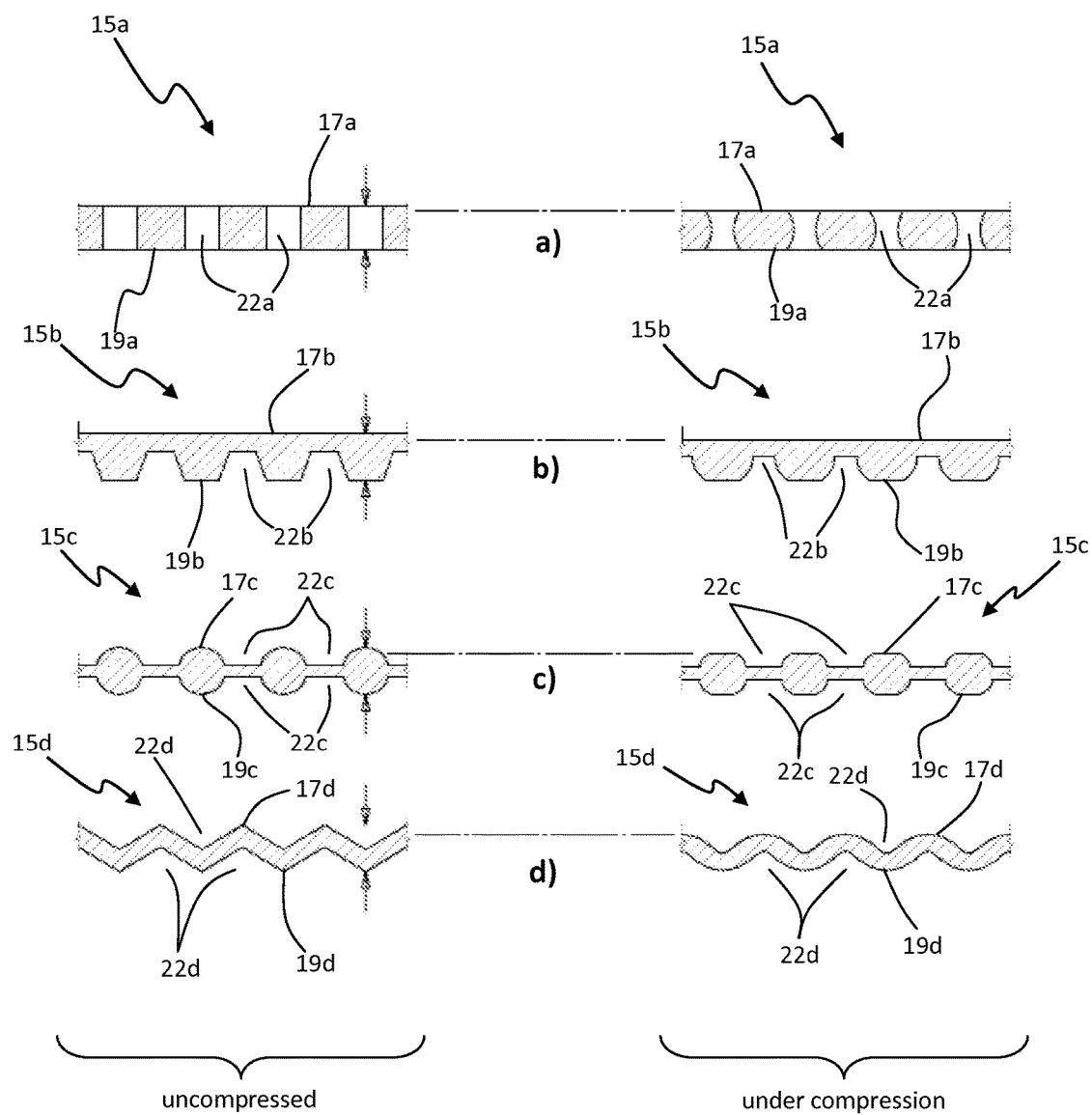
FIG. 11a shows a section view of the cushioning slide second layer along AA in FIG. 10a in uncompressed and compressed states.
FIG. 11b shows a section view of the cushioning slide second layer along BB in FIG. 10b in uncompressed and compressed states.
FIG. 11c shows a section view of the cushioning slide second layer along CC in FIG. 10c in uncompressed and compressed states.
FIG. 11d shows a section view of the cushioning slide second layer along DD in FIG. 10d in uncompressed and compressed states.

The elastomer cannot deflect laterally outwards under compression as the cushioning slides (13, 113) in both embodiments are surrounded on their exterior lateral periphery by rigid portions (21, 121) of the weight (3, 103). Therefore, under compression, the elastomer (15, 115) is only able to displace laterally inwards into the circular displacement voids (22, 122). In further embodiments (not shown), the displacement voids may be formed in the first layer underside (18, 118), and/or the rigid upper surface (21, 121) of the weight (3, 103) underneath the elastomer (15, 115), However, a variety of alternative configurations of displacement void are possible and exemplary samples are illustrated in FIGS. 10 and 11. FIGS. 10a-10d show four alternative second layer (15a, 15b, 15c, 15d) embodiments incorporating four different displacement voids configurations, shown in greater detail in section view in FIGS. 11a-11d respectively. Although each second layer (15a-d) is shaped to fit the corresponding contours of the weight surface (21, 121) to which it's fitted, the portion of each second layer (15a-d) adjacent a side wall (8, 9, 108, 109) is still substantially planar.

FIGS. 10a and 10b respectively show cushioning slides (13, 113) configured to be fitted to a longitudinal apex (20, 120). FIGS. 10c and 10d respectively show rectangular and circular cushioning slides (13, 113) for fitment to a side wall (8, 9, 108, 109).

FIGS. 11a-11d, show enlargements of section views through the lines AA, BB, CC and DD in FIGS. 10a-10d respectively before (LHS) and after (RHS) the application of a compressive force in the direction of the arrows.

FIG. 11a shows a second layer (15a) with a series of displacement voids (22a) in the form of apertures extending orthogonally through the second layer (15a) from the upper surface (17a) to the lower surface (19a). The right side illustration shows the elastomer material of the second layer (15a) bulging into the adjacent displacement voids (22a).

FIG. 11b shows a second layer (15b) with a series of displacement voids (22b) in the form of repeated corrugated indentations in the underside (19b) of the second layer (15b). The corrugations become shorter and wider under the effects of compression and deflect into the voids (22b).

FIG. 11c shows a second layer (15c) with a series of displacement voids (22c) in the form of repeated indentations formed between a plurality of circular cross-section projections on both the underside (19c) and upper surface (17c) of the second layer (15c). Under compression, the projections deflect laterally into the displacement voids (22c) thereby becoming shorter and wider.

FIG. 11d shows a second layer (15d) formed with a saw tooth shaped underside (19d) and upper surface (17d) creating a corresponding series of saw tooth shaped displacement voids (22d). The apex of the saw tooth profile is flattened under the effects of compression thus deflecting into voids (22d). It will be readily appreciated that numerous alterative displacement void configurations are possible and that the combinations of cushioning slides (15a-d) shown in FIGS. 10a-d and while the displacement void (22a-d) configurations in FIGS. 11a-d are optimised examples they should not be seen to be limiting.

The shock absorbing elastomer forming the above described second layers (15, 115, 15a-15d) all provide a configuration to absorb the impact shock by allowing the elastomer to be deflected into the displacement voids (22, 122, 22a-22d) thereby preventing damage to the elastomer polymer. The deflection is typically less than 30% as above 30% deflection there is an increasing likelihood of damage occurring to the cushioning slides.

The shock absorbing potential capacity of the cushioning slides (13, 113) is enhanced by keeping the adjacent contact surfaces of the first (14, 114) and second (15, 115) layers unbonded or un-adhered to each other. The contact surfaces being first layer upper surface (17, 117) and the second layer lower surface (18, 118). This enables the elastomer upper surface (17) to move laterally across the underside (18) of the first layer under compression. However, the first (14, 114) and second layers (15, 115) clearly require a means to maintain their mutual contact under the violent effects of the impacting operations.

Figure 12:
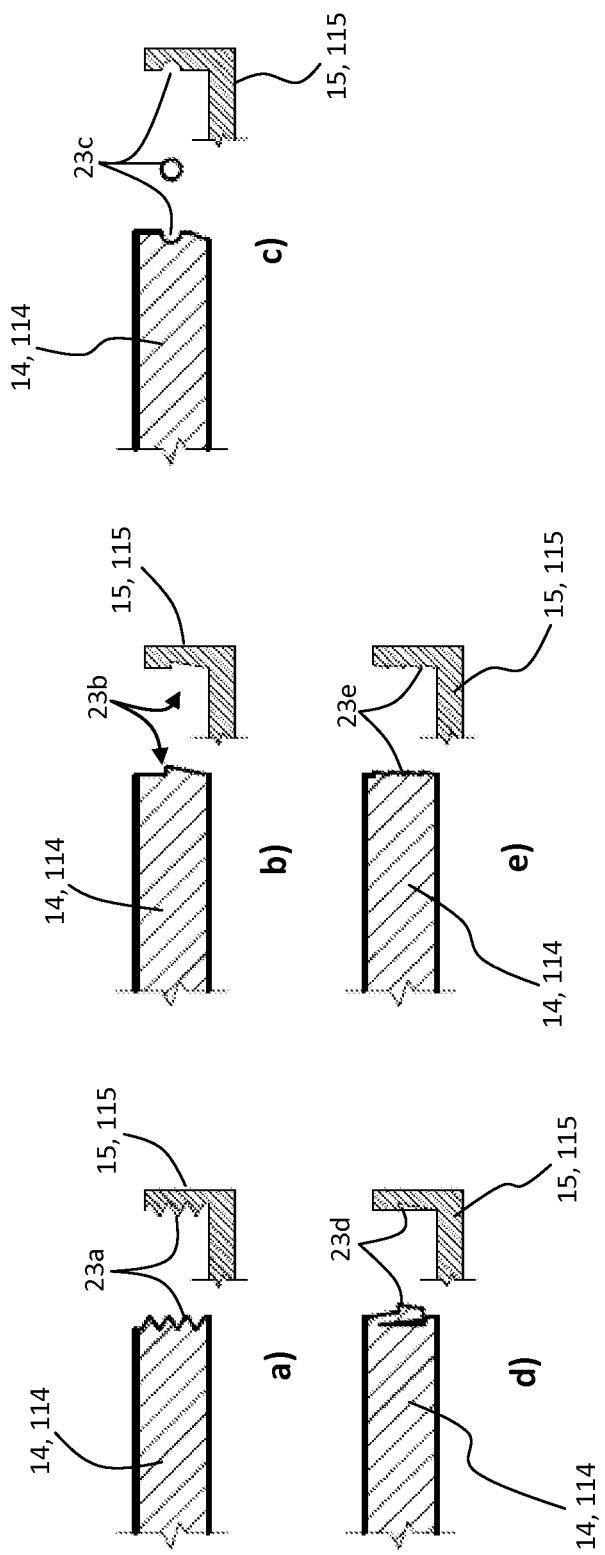
FIG. 12a shows an enlarged side section elevation of a peripheral portion of a cushioning slide with a first securing feature.
FIG. 12b shows an enlarged side section elevation of a peripheral portion of a cushioning slide with a second securing feature.
FIG. 12c shows an enlarged side section elevation of a peripheral portion of a cushioning slide with a third securing feature.
FIG. 12d shows an enlarged side section elevation of a peripheral portion of a cushioning slide with a fourth securing feature.
FIG. 12e shows an enlarged side section elevation of a peripheral portion of a cushioning slide with a fifth securing feature.

FIG. 12 shows a selection of exemplary configurations of securing features (23) configured to keep the first (14, 114) and second layers (15, 115) in mutual contact.

FIG. 12a shows a securing feature (23a) in the form of mating screw thread portions located at the lateral periphery of the first layer (14, 114) and the inner surface of an outer lip portion of the second layer (15, 115) substantially orthogonal to the surface of the weight (3, 103).

FIGS. 12b, 12c, 12d and 12e show securing features (23b, 23c, 23d, and 23e) in the form of:
  a tapered recess and projecting lip portion;
  O-ring seal and complementary grooves;
  an elastic clip portion and mating recess;
  serrated, interlocking portions, also located at the lateral periphery of the first layer (14, 114) and the inner surface of an outer lip portion of the second layer (15, 115) substantially orthogonal to the surface of the weight (3, 103).

The second layer (15, 115) is sufficiently flexible such that it can be pressed over the first layer and corresponding securing features (23) to become locked in position. Alternatively, where the cushioning slides (13, 113) are circular the second layer (15, 115) may be screwed onto the first layer (14, 114) where a suitable mating thread is provided as per FIG. 12a).

Yet further variations of securing features (23f-23k) are shown in FIGS. 13a-f to secure a cushioning slide (13) to the narrow side wall (9) of a hammer weight (3) in a complimentary position to that showed for the embodiment shown in FIGS. 1 and 3.

FIG. 13a shows an individual first layer (14a) and a second layer (15e) located at the longitudinal apices (20), without any direct physical connection across the narrow side wall (9) between adjacent cushioning slides (13). The first and second layers (14a, 15e) are not directly secured to each other and instead, the securing feature (23f) relies on the physical proximity of the housing inner side walls (107) to retain the cushioning slide (13) in position.

FIG. 13b shows a first layer (14b) and a second layer (15f) located at both the longitudinal apices (20) and extending across the width of the narrow side wall (9) and part of the wide side walls (8). The first and second layers (14b, 15f) are not directly secured to each other and instead, the securing feature (23g) relies on the physical proximity of the housing inner side walls (107) to retain the cushioning slide (13) in position.

FIG. 13c shows a comparable arrangement of the first layer (14b) and a second layer (15f) as shown in FIG. 13 b).

However, the securing feature (23h) is provided as protrusions in the second layer (15) shaped and positioned to mate with corresponding recesses in the first layer (14c) and hammer apices (20). The securing feature (23h) thus secures the cushioning slide (13) to the weight (3) by a tab and complementary recess located on the mating surfaces of the first and second layers (14c, 15g) respectively.

FIG. 13d also shows a comparable arrangement of the first layer (14b) and a second layer (15f) as shown in FIG. 13b). The securing feature (23i) comprises a screw, fitted through a countersunk aperture in the first layer (14d) and through an aperture in the second layer (15h) into a threaded hole in the narrow sidewall (9).

FIG. 13e shows a comparable arrangement of the first layer (14c) and a second layer (15f) as shown in FIG. 13b). However, the securing feature (23j) instead comprises a cross pin, fitted through apertures in the first layer (14e) second layer (15i) and weight (3) from one wide side wall (8) to the opposing side wall (8).

FIG. 13f shows a comparable arrangement to that shown in FIG. 13c) with a recess in the hammer weight (3) mating with a corresponding tab at the base of the second layer (15g, 15j). However, the securing feature (23k) secures the first layer (14j) to the second layer (14f) in a reverse arrangement, i.e. recesses in the second layer (15j) mating with corresponding protrusions in the first layer (14f).

The above-described cushioning slides (13, 113) have a UHMWEP first layer (14, 14a-f, 114) and a polyurethane elastomer second layer (15, 15a-j, 115) to provide a relatively lightweight cushioning slide (13, 113) while providing sufficient shock-absorbing and low-friction capabilities. As discussed above, the high deceleration forces (up to 1000G) create significant additional forces for any increase in weight of the cushioning slide (13, 113). Thus, while it is possible to use materials such as steel for the first layer (14, 114) this configuration would add greater mass by virtue of its higher density and thus have a higher inertia than a UHMEPE first layer (14, 114) during impacts.

FIG. 14 shows an embodiment of a cushioning slide (13) that uses a steel first layer (14). FIG. 14 is an exploded and part assembled view of a steel first layer (14) and elastomer second layer (15). The steel first layer (14) has a conventional planar upper surface (16) and a lower surface (18) formed with one part of a securing feature (23m) in the form of a cellular configuration with a plurality of subdividing wall portions projecting orthogonally away from the lower surface (18). The second layer (15) includes an upper surface (17) formed with the complimentary mating part of the securing feature (23m) in a cellular configuration projecting orthogonally away from the upper surface (17). The first and second layers (14, 15) interlock with the cellular configurations of the securing feature (23m) thereby securing to each other. The plurality of interlocked portions of the steel first layer (14) and the elastomer second layer (15) creates a strong coupling, highly resistant to separation under the effects of impact forces parallel to the plane of the weight surface (21, 121). It will be noted the interlocking securing feature (23m) does not extend through the full thickness of the second layer (15) to the underside surface (19). Instead, a lower portion of the second layer (15) positioned between the lower surface (19) and the securing feature (23m) is used to incorporate a form of displacement void (22) for accommodating deflection of the second layer (15) material during compression.

It will be appreciated that any impact forces acting to separate the first layer (14, 114) from the second layer (15, 115) also act to separate the whole cushioning slide (13, 113)

from the weight (3, 103). It also follows that the means of securing the whole cushioning slide (13, 113) to the weight (3, 103) against the adverse effects of high G forces are even higher than those applied solely to the first layer (14, 114). Consequently, as shown in FIGS. 3-7, 14 and 15, the weight (3, 103) is provided with a robust means to secure the cushioning slides (13, 113) to the weight (3, 103), provided in the form of sockets (24, 124) on the side walls (8, 108 and 9, 109).

As shown in FIGS. 3-7, 14 and 15, the cushioning slides (13, 113) are located on the weight (3, 103) in a socket (24, 124) formed with a retention face (25, 125) positioned at a cushioning slide perimeter. The retention face (25, 125) at the cushioning slide perimeter may be located about:
  a lateral periphery of;
  an inner aperture through, and/or
  a recess in,
the cushioning slide (13, 113).

Each retention face (25, 125) may be formed as a ridge, shoulder, projection, recess, lip, protrusion or other formation presenting a rigid retention face between one of the weight distal ends (10, 110, 11, 111) and at least a portion of the cushioning slide (13, 113) located in the socket (25, 125) on a side wall (8, 9, 108, 109) of the weight (3, 103).

Figure 15:
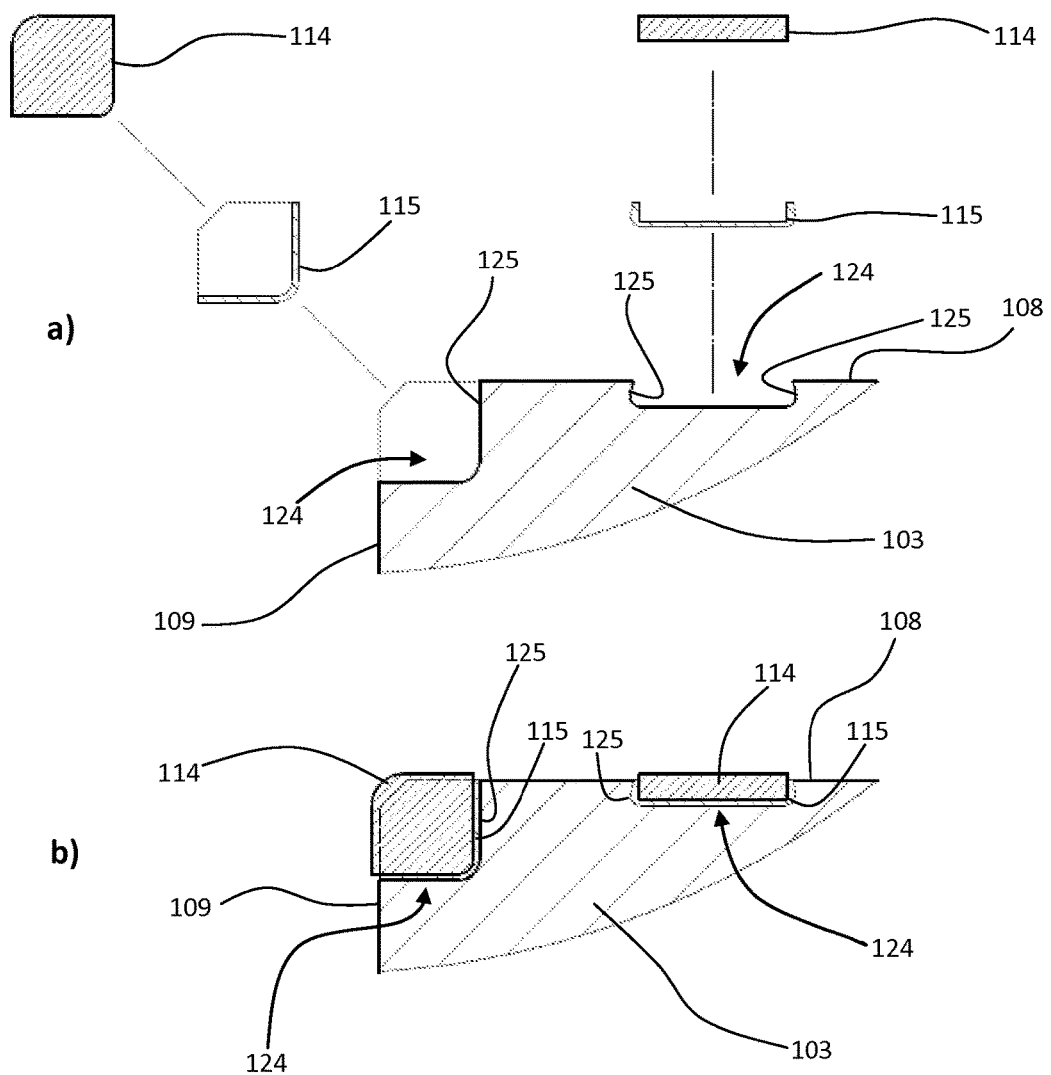

The retention face (125) of the wide side wall socket (124) shown in FIG. 15 is formed as an inwardly tapered wall (125) of the socket (124) to secure the cushioning slide (13, 113) to the weight side wall (108,) from the component of forces substantially orthogonal to the weight side walls (108). Other retention features (not shown) could include a reverse taper, upper lip, O-ring groove, threads, or other inter-locking-features with the slide (113).

In the aforementioned embodiments, each socket retention face (25, 125) may be formed as outwardly or inwardly extending walls extending substantially orthogonal to the corresponding side walls (8, 9, 108, and 109).

Figure 16:
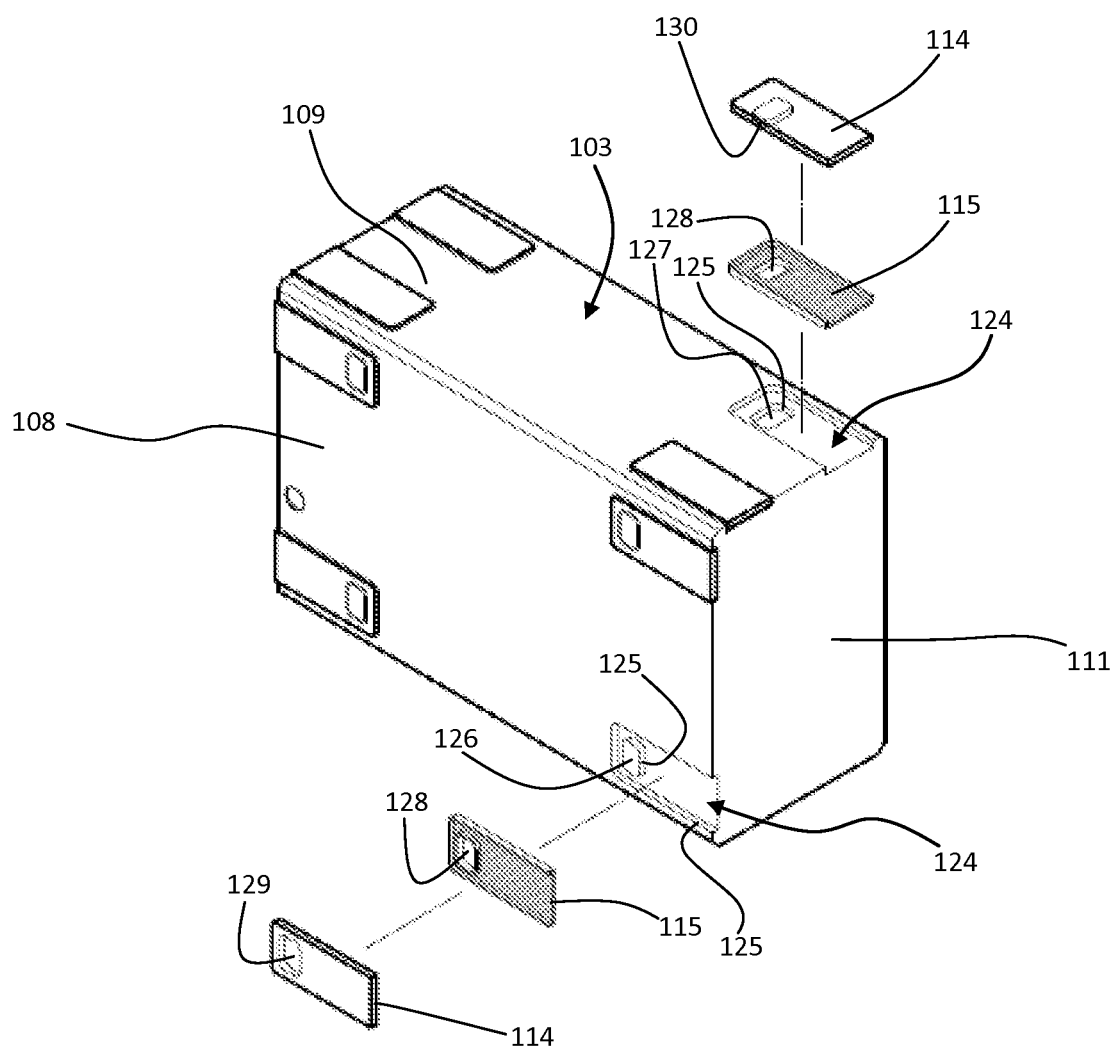
FIG. 16 shows an isometric, part-exploded view of the weight of FIG. 2 with a further cushioning slide embodiment

In the embodiment shown in FIG. 16 a retention face (25, 125) is located inside the perimeter of a socket (124) in the side wall (108) under the second layer (15, 115) and is formed as an outwardly extending wall thus forming corresponding location projections (126). Inwardly extending retention faces (125) on the narrow side walls (109) form location recesses (127) performing the same retention function as the location projections (126).

In the embodiment of FIG. 16, the location projection (126) passes through an aperture (128) in the second layer (115) and an aperture (129) in the first layer (114). Also shown in FIG. 16, the converse configuration is shown in a separate socket (124) where a locating portion (130) extends from the lower surface (118) of the first layer (114) to project though the aperture (128) in the second layer into locating recess (127).

The use of a location recess (127) or a location projection (126) enables a cushioning slide (13, 113) to be positioned directly adjacent the upper or lower distal face (110, 111) without a retention face (125) surrounding the entire outer periphery of the cushioning slide (13, 113) as in the embodiments shown in FIGS. 1-4 and FIGS. 6-9.

It should be appreciated that sockets (124) may not be necessary when using such location projections (126) or location recesses (127). Instead, the cushioning slides (113) may lie directly on the outer surfaces (108, 109) with only the location projections (126) or location recesses (127) respectively extending outwards or inwards from the corresponding surface (108, 109).

FIG. 3d shows a corresponding embodiment applied to the hammer weight (3) with a location projection (26) passing through an aperture (28) in the second layer (15) and an aperture (29) in the first layer (14).

Figure 17:
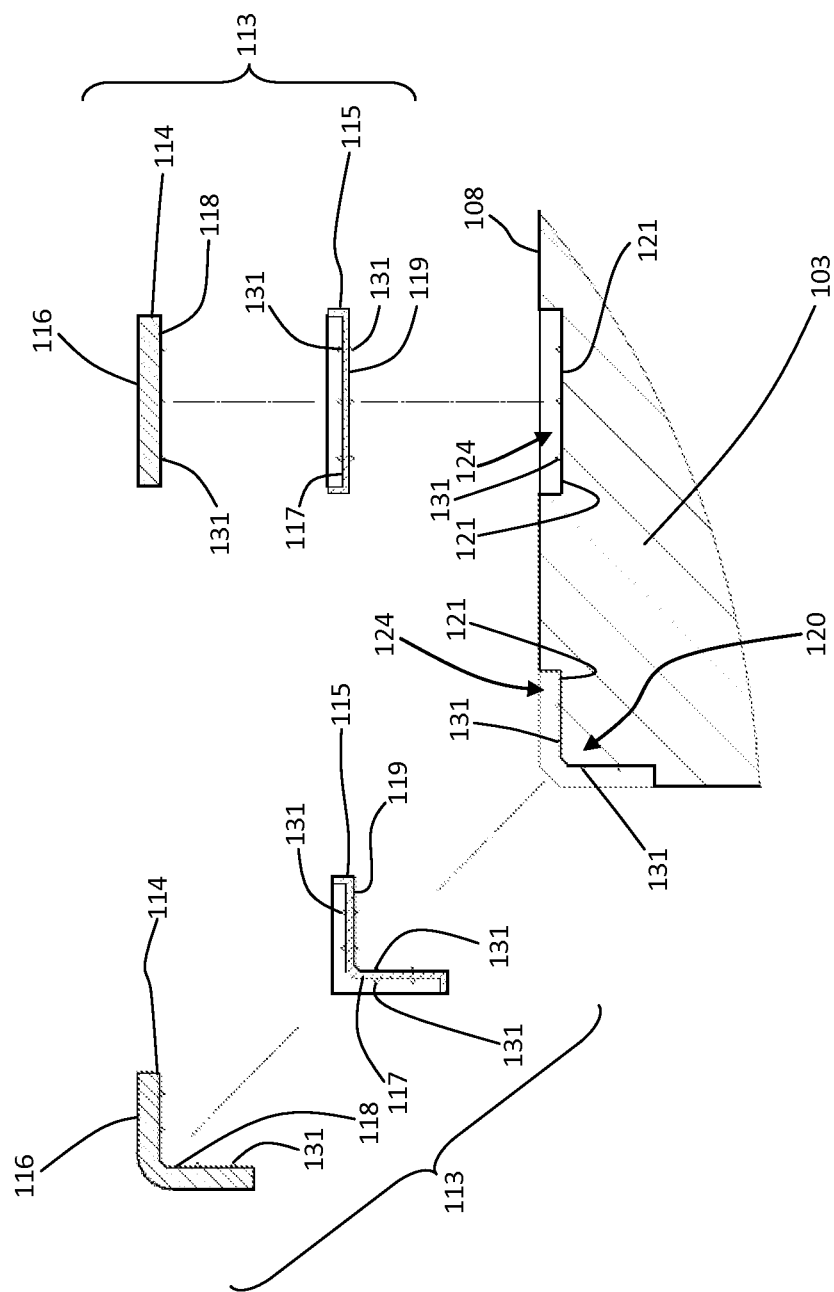
FIG. 17 shows an enlarged exploded plan section view of cushioning slides incorporating pre-tensioning features fitted to the weight of FIG. 2.
Figure 18:
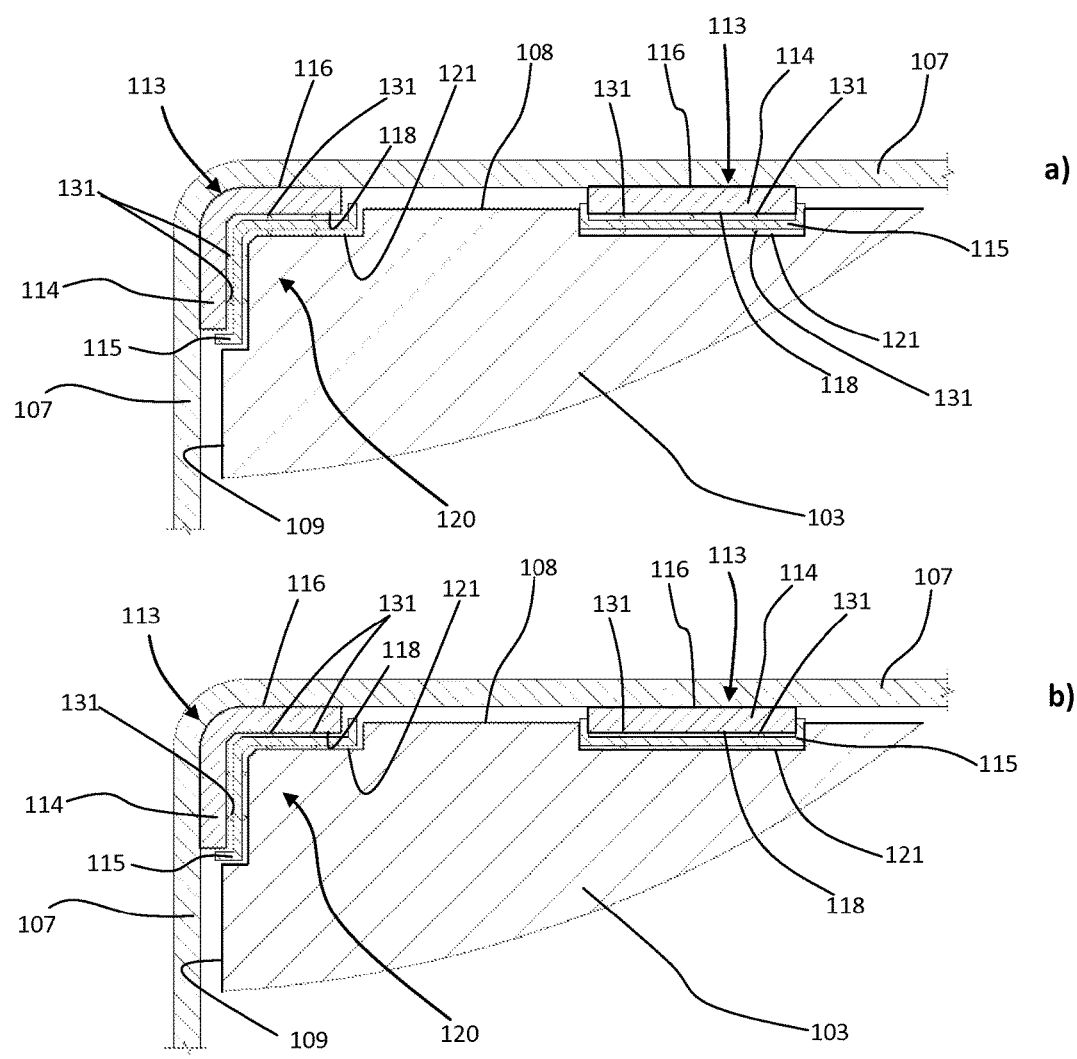
FIG. 18a shows an enlarged plan section view of the weight and cushioning slides in FIG. 17 located inside the housing inner side walls, the cushioning slide having pre-tensioning features fitted.
FIG. 18b shows an enlarged plan section view of weight and cushioning slides in FIG. 18a, with a compressive force applied to the pre-tensioning features.

As previously identified, the greater the separation between the weight (3, 103) and the housing inner side walls (7, 107), the greater distance available for the weight to increase lateral speed under the lateral component of force (e.g. gravity), thereby increasing the resultant impact force. The embodiment shown in FIGS. 17 and 18 show a pair of cushioning slides (113) fitted to an apex (120) and a side wall (108) of a hammer weight (103). The cushioning slides (13) incorporate multiple pre-tensioning surface features (131, not all labelled) located on;
  the first layer lower surface (118);
  the second layer upper surface (117);
  the second layer lower surface (119), and
  the weight side wall surface (121) adjacent the underside of the second layer (119).

It will be appreciated however that the pre-tensioning surface features (131) need only be formed on one of the above four surfaces to function successfully. In the embodiment shown in FIGS. 17 and 18 the pre-tensioning features are small spikes, though alternatives such as fins, buttons, or the like are possible.

The pre-tensioning features (131) are elastic and shaped so that they are more easily compressed than the main planar portion of the second layer (115), The pre-tensioning surface features (131) also create a spacing between the first (114) and second (115) layers and between the second layer (115) and the corresponding side wall (108 or 109).

The pre-tensioning surface features (131) are formed to bias the cushioning slide's exterior surfaces (116) into continuous contact with the housing inner side walls (107) during reciprocation of the weight (113). In use, the pre-tensioning features (131) are pre-tensioned when the weight (103) is laterally positioned equidistantly within the housing inner side walls (107), as shown in FIG. 18a).

The exterior surface (116) of first layer (114) is thus biased into light contact with the housing inner side walls (107) when the housing inner side walls (107) is in equilibrium, (as shown in FIG. 18a) e.g. orientated substantially vertical. During operations, any lateral component of a force acting on the weight (103) acts to compress the pre-tensioning features (131) as shown in FIG. 18b). Any continued compressive force from that point onwards causes the elastomer of the second layer (115) to deflect as discussed with respect to the aforementioned embodiments.

FIG. 19a shows an alternative cushioning slide (213) with a first layer (214) formed from a disc of metal or plastic with an exterior surface (216) and an interior surface (218). The interior surface (218) is formed by machining out a volume of the disc thickness. The cushioning slide (213) could also be a rectilinear or other shape and the disc is just one example. The second layer (215) is formed from three sub-layers including an elastomer upper layer (231), an intermediate rigid steel or plastic layer (232) and a lower elastomer layer (233). The second layer (215) has an outer surface (217) abutting the first layer interior surface (218) and a second layer interior surface (219) abutting a socket (24) in the reciprocating weight (3).

As per the previous embodiments, the layers (231, 232, 233) may be formed with displacement voids to accommodate volume displacement of the elastomer layers (231, 233) under compression.

The intermediate rigid layer (232) provides a rigid boundary for the elastomer layers (231, 233) and thereby ensures the elastomer layers deflect laterally under compression. A single, thicker elastomer layer may provide good shock-absorbency but is vulnerable to overheating as the amount of compression and expansion is relatively large compared with multiple thinner layers.

The upper elastomer layer (231) is shaped to provide a pre-tensioning feature for biasing the first layer (214) against the housing inner side walls (7, 107). The pre-tensioning feature is achieved in this example by forming the elastomer layer (231) as a bowl with a convex exterior surface (217). Alternatively, as in the embodiments shown in FIGS. 17 and 18, pre-tensioning surface features may be utilised such as ridges, fins or other protrusions that push against the first layer (214) but compress easier than the elastomer layer (231, 233).

The lower elastomer layer (233) is also formed with a similar pre-tensioning shape feature and further includes a recess (234) for accommodating the peripheral wall (235) of the first layer (214). The recess (234) is sufficiently deep such that when assembled in an uncompressed state (FIG. 18b) the first layer wall (235) is not touching the base of the recess (234) thereby permitting travel of the first layer (214) when the cushioning slide (213) is impacted.

The cushioning slide (213) components may be vulnerable to relative sliding between rigid layers (214, 232) and elastomer layers (231, 233) when subjected to high accelerations along the impact axis. Any relative sliding may allow the rigid layers 232) to move and damage the other layers (233, 231). Thus, in the embodiment shown in FIG. 19, the first (214) and second (215) layers are dimensioned to provide a close-fit when assembled to prevent such problems, such as damage to the contacting edges of the rigid layers (232) and (214), particularly those resulting from high accelerations along the impact axis.

The cushioning slide (213) is thus formed as a layered stack which offers improved shock-absorbing characteristics over a singular second layer (15), (115) as in the previous embodiments. The cushioning slide (213), while more complex and costly, may be useful in applications in extremely high impact forces where the cushioning slides (13), (113) are not sufficiently robust. Accordingly, the first layer (214) could be formed from steel or plastic with high wear resistance which, while increasing weight offers increased robustness for high shock loads.

Aspects of the present invention have been described by way of example only and it should be appreciated that modifications and additions may be made thereto without departing from the scope thereof.

The invention claimed is:

1. An apparatus including a reciprocating component fitted with at least one composite cushioning slide on an exterior surface of the reciprocating component, said reciprocating component being movable along a reciprocation path and said composite cushioning slide including:
   an exterior first layer, formed with an exterior surface configured and orientated to come into at least partial sliding contact with a containment surface of said apparatus during said reciprocating movement of the component, said first layer being formed from a material of predetermined friction and/or abrasion resistance properties, and
   an interior second layer located between said first layer and said reciprocating component, said second layer at least partially formed from a shock-absorbing material having predetermined shock absorbing properties.

2. The apparatus of claim 1, wherein the second layer has at least one surface connected to the first layer and an interior surface connected to the reciprocating component.

3. The apparatus of claim 1, wherein the first layer exterior surface is preferably a lower friction surface than said second layer.

4. The apparatus as claimed in claim 1, wherein said apparatus is an impact hammer, wherein said reciprocating component is a weight and said containment surface includes housing inner side walls of said impact hammer.

5. The apparatus as claimed in claim 1, wherein the first layer exterior surface is formed from an engineering plastic in the group of including:
   Ultra High Molecular Weight Polyethylene (UHMWPE), Spectra®, Dyneema®;
   Polyether Ether ketone (PEEK);
   PolyAmide-Imide (PAI);
   PolyBenzimIdazole (PBI);
   PolyEthylene Terephthalate (PET P);
   PolyPhenylene Sulphide (PPS);
   Nylon including lubricant and/or reinforced filled nylon such as Nylatron™NSM or Nylatron™GSM;
   Composites such as Orkot;
   any combination or permutation of the above.

6. The apparatus as claimed in claim 1, wherein the first layer exterior surface is formed from:
   cast iron, and/or
   steel, including any alloy and/or heat treatment of the steel.

7. The apparatus as claimed in claim 1, wherein the second layer has greater compressibility than said first layer.

8. The apparatus as claimed in claim 1, wherein said predetermined friction properties of the first layer are an unlubricated coefficient of friction of less than 0.35 on dry steel of surface roughness Ra 0.8 to 1.1 μm.

9. The apparatus as claimed in claim 1, wherein said predetermined abrasion resistance properties of the first layer are a wear rate of less than $10 \times 10^{-5}$ m$^2$/N using metric conversion from ASTM D4060.

10. The apparatus as claimed in claim 1, wherein said first layer possesses:
    tensile strength of more than 20 MPa and compressive strength at 10% deflection of more than 30 MPa; and/or
    a hardness of more than 55 Shore D; and/or
    a high PV (pressure×velocity) value e.g. above 3000.

11. The apparatus as claimed in claim 1, wherein the first layer exterior surface has an application of a dry lubricant including at least one of: spray-on graphite, Teflon or molybdenum disulphide and/or the first layer is embedded with a dry lubricant such as molybdenum disulphide.

12. The apparatus as claimed in claim 1, wherein said first layer is able to withstand an instantaneous sliding speed of more than 5ms$^{-1}$ and up to 10ms$^{-1}$ at a sliding pressure of more than 0.05 MPa and up to 4 MPa with a wear rate of no more than 0.01 cm$^3$ per meter of travel, when used on steel with surface roughness of approx Ra=0.8 μm to 1.1 μm.

13. The apparatus as claimed in claim 1, wherein the first layer is capable of withstanding a shock pressure of more than 0.3 MPa and up to 20 MPa without permanent deformation.

14. The apparatus as claimed in claim 1, wherein the second layer is formed from multiple sub-layers.

15. The apparatus as claimed in claim 1, wherein said second layer includes an elastomer layer.

16. The apparatus as claimed in claim 15, wherein said elastomer has a Shore A scale value of 40 to 95.

17. The apparatus as claimed in claim 1, wherein the first and second layers are releasably attached together.

18. The apparatus as claimed in claim 17, wherein said releasable attachment is a nesting arrangement such that the containment surface holds the layers in place in a socket in the reciprocating component.

19. The apparatus as claimed in claim 1, wherein a portion of said reciprocating component adjacent the cushioning slide is provided with at least one displacement void, configured to receive a portion of said second layer displaced during compression.

20. The apparatus as claimed in claim 1, wherein said cushioning slide is provided with at least one displacement void, configured to receive a portion of said second layer displaced during compression.

21. The apparatus as claimed in claim 20, wherein said displacement void is formed as:
  an aperture extending through the second layer;
  a repeating corrugated, ridged, beaded, saw-tooth and/or castellated pattern applied to at least one second layer side contacting the first layer and/or reciprocating component;
  a scalloped or otherwise recessed lateral peripheral portion, or
  any combination or permutation of same.

22. The apparatus as claimed in claim 1, wherein said first and second layers are substantially parallel.

23. The apparatus as claimed in claim 1, wherein said second layer is substantially parallel to an outer surface of said reciprocating component.

24. The apparatus as claimed in claim 1, wherein the first and second layers are un-bonded to each other.

25. The apparatus as claimed in claim 1, wherein the cushioning slides are located on the reciprocating component in at least one socket, said reciprocating component having a lower impact face and at least one side face, said socket being formed with at least one ridge, shoulder, projection, recess, lip, protrusion or other formation presenting a rigid retention face between said lower impact face and at least a portion of the cushioning slide located in the socket on a side wall of the reciprocating component.

26. The apparatus as claimed in claim 25, wherein said retention face is positioned at a cushioning slide perimeter located about:
  a lateral periphery of;
  an inner aperture through, and/or
  a recess in,
  the cushioning slide.

27. The apparatus as claimed in claim 25, wherein said retention face is formed as outwardly extending walls forming at least one projection, projecting substantially orthogonal to a corresponding side wall of the reciprocating component.

28. The apparatus as claimed in claim 25, wherein said retention face is formed as inwardly extending walls forming at least one recess, substantially orthogonal to a corresponding side wall of the reciprocating component surface.

29. The apparatus as claimed in claim 25, wherein said retention face includes retention features to secure the cushioning slide to the reciprocating component side wall.

30. The apparatus as claimed in claim 29, wherein said retention face includes walls forming at least one location projection passing through an aperture in at least the second layer.

31. The apparatus as claimed in claim 30, wherein said first layer includes an aperture, said location projection passing through said first layer aperture.

32. The apparatus as claimed in claim 29, wherein said retention features include at least one of: a reverse taper, upper lip, O-ring groove, threads, nesting or interlocking feature to retain the cushioning slide attached to the reciprocating component.

33. The apparatus as claimed in claim 25, including a locating portion of the first layer of the cushioning slide extending through said second layer into a recess in the reciprocating component side wall, said recess thereby presenting a retention face to said location portion.

34. The apparatus as claimed in claim 25, configured with dimensions such that when the second layer is compressed past its normal operating limits the surface of the reciprocating component surrounding the socket containing the cushioning slide bears on the containment surface.

35. The apparatus as claimed in claim 1, wherein said reciprocating component has a lower impact face and at least one side face, the cushioning slides are located on the reciprocating component on an outer surface of said side face, said side face being formed with at least one ridge, shoulder, projection, recess, lip, protrusion or other formation presenting a rigid retention face between said lower impact face and at least a portion of the cushioning slide located on said side wall of the reciprocating component.

36. The apparatus as claimed in claim 1, wherein the second layer is an elastomer layer bonded directly to the surface of the reciprocating component side wall.

37. The apparatus as claimed in claim 1, wherein said cushioning slides are located towards either end of said reciprocating component.

38. The apparatus as claimed in claim 1, wherein said first layer is formed to project beyond the outer periphery of the reciprocating component side walls adjacent the cushioning slide.

39. The apparatus as claimed in claim 1, wherein said reciprocating component is square or rectangular in lateral cross-section, with substantially planar side walls connected by four apices, wherein a said cushioning slide is located on at least two sides, two apices, and/or one side and one apex.

40. The apparatus as claimed in claim 1, wherein said cushioning slides are located on at least two pairs of opposing side walls and/or apices.

41. The apparatus as claimed in claim 1, wherein a said cushioning slide is shaped as an elongate substantially rectangular/cuboid plate or blade configuration, with a pair of wide parallel longitudinal faces, joined by a pair of parallel narrow side faces.

42. The apparatus as claimed in claim 1, including at least two said cushioning slides located on opposing sides of a rectangular cross-sectioned reciprocating component, said cushioning slides being configured and dimensioned to extend about a pair of adjacent apices.

43. The apparatus as claimed in claim 42, wherein said reciprocating component is configured and dimensioned such that at least one said cushioning slide is in continuous contact with the containment surface during reciprocation of the reciprocating component.

44. The apparatus as claimed in claim 1, wherein said cushioning slides include at least one pre-tensioning feature for biasing the first layer toward the containment surface.

45. The apparatus as claimed in claim 44, wherein said pre-tensioning feature is a pre-tensioning surface feature formed in or on at least one of:
  the first layer lower surface;
  the second layer upper surface;
  the second layer lower surface,
  a surface of a second layer sub-layer, and/or
  the reciprocating component side wall surface adjacent the underside of the second layer, said pre-tensioning feature biasing apart the surface provided with at least one pre-tensioning feature and an adjacent surface contacting said pre-tensioning feature.

46. The apparatus as claimed in claim 44, wherein said pre-tensioning feature is a surface feature shaped and sized such that it compresses more easily than said second layer.

47. The apparatus as claimed in claim 44, wherein the pre-tensioning feature is formed from a material having a lower elastic modulus than said second layer material.

48. The apparatus as claimed in claim 44, wherein the pre-tensioning feature is tensioned when the cushioning slide is assembled on the reciprocating component, the pre-tensioning feature formed by shaping the second layer, or sub-layer thereof, to provide said bias.

49. The apparatus as claimed in claim 44, wherein said pre-tensioning feature is elastic.

50. The apparatus as claimed in claim 44, wherein a said pre-tensioning feature is pre-tensioned when the reciprocating component is laterally equidistantly positioned within the containment surface.

51. The apparatus as claimed in claim 44, wherein a said pre-tensioning feature includes spikes, fins and/or buttons formed in the second layer.

52. The apparatus as claimed in claim 1, further including a wear buffer.

53. The apparatus as claimed in claim 52, wherein said wear buffer is provided by a retention face configured as walls forming at least one location projection passing through apertures in the first and second layers.

54. A cushioning slide for attachment to a reciprocating component in an apparatus;
   said reciprocating component being movable along a reciprocation path in at least partial sliding contact with at least one containment surface of said apparatus,
   said cushioning slide formed with an exterior first layer and an interior second layer, wherein;
      said first layer is formed with an exterior surface configured and orientated to come into at least partial contact with said containment surface during said reciprocating movement of the component, said first layer being formed from a material of predetermined low friction properties, and
      said second layer is formed with at least one surface connected to said first layer and at least one interior surface connectable to said reciprocating component, said
   second layer being formed from a material of predetermined shock absorbency properties.

* * * * *